(12) United States Patent
Yanagihara et al.

(10) Patent No.: US 7,648,001 B2
(45) Date of Patent: Jan. 19, 2010

(54) SPEED SHIFT ARRANGEMENT FOR WORK VEHICLE

(75) Inventors: Katsumi Yanagihara, Osaka (JP);
Shigeo Shoen, Osaka (JP); Kenkichi Hirakawa, Izumi (JP); Takahiro Komine, Tsukuba (JP); Tadashi Nakamura, Kawachinagano (JP)

(73) Assignee: Kubota Corporation, Osaka (JP)

( * ) Notice: Subject to any disclaimer, the term of this patent is extended or adjusted under 35 U.S.C. 154(b) by 323 days.

(21) Appl. No.: 11/509,306

(22) Filed: Aug. 24, 2006

(65) Prior Publication Data

US 2007/0056793 A1 Mar. 15, 2007

(30) Foreign Application Priority Data

Sep. 13, 2005 (JP) .............................. 2005-265333
Nov. 18, 2005 (JP) .............................. 2005-334293
Mar. 6, 2006 (JP) .............................. 2006-059619
Mar. 29, 2006 (JP) .............................. 2006-090281

(51) Int. Cl.
*B60K 17/06* (2006.01)
*B60K 17/08* (2006.01)

(52) U.S. Cl. .................. 180/336; 74/473.26; 74/473.35

(58) Field of Classification Search ................. 180/336, 180/315, 78; 74/473.26, 473.28, 473.35, 74/469, 73.1, 473.2

See application file for complete search history.

(56) References Cited

U.S. PATENT DOCUMENTS

| | | | | |
|---|---|---|---|---|
| 2,917,941 A | * | 12/1959 | Wittren | 74/473.33 |
| 3,513,717 A | * | 5/1970 | Lickey et al. | 74/473.26 |
| 3,616,709 A | * | 11/1971 | Malm | 74/413 |
| 3,757,598 A | * | 9/1973 | Van Dest | 74/473.3 |
| 3,975,970 A | * | 8/1976 | Elfes et al. | 74/473.1 |
| 4,249,404 A | * | 2/1981 | Kimberlin | 70/248 |
| 4,338,828 A | * | 7/1982 | Ruhlman | 74/473.27 |
| 4,531,423 A | * | 7/1985 | Fogelberg | 74/473.26 |
| 4,537,088 A | * | 8/1985 | Kubota | 74/473.31 |
| 5,187,998 A | * | 2/1993 | Asano et al. | 74/523 |
| 5,878,623 A | * | 3/1999 | Teich | 74/473.3 |

(Continued)

FOREIGN PATENT DOCUMENTS

JP 40019051U B 7/1965

(Continued)

*Primary Examiner*—Paul N Dickson
*Assistant Examiner*—Nicole Verley
(74) *Attorney, Agent, or Firm*—The Webb Law Firm

(57) ABSTRACT

A work vehicle comprises a plurality of wheels; a propelling speed change device supported by the plurality of wheels and having at least one forward travel position and a reverse travel position with substantially the same speed reduction ratio as the forward travel position; a steering wheel for steering at least one of the plurality of wheels; a steering wheel support shaft for supporting the steering wheel; a speed change lever located in a position laterally of the steering wheel support shaft and operatively connected to the propelling speed change device to operate the propelling speed change device; a speed change lever guide for guiding the speed change lever, the guide including: a plurality of fore and aft channels extending substantially in the fore and aft direction of the work vehicle; a communication channel extending between the plurality of fore and aft channels; wherein one of the plurality of the fore and aft channels has a first lever position corresponding to the forward travel position and a second lever position corresponding to the reverse travel position.

12 Claims, 18 Drawing Sheets

U.S. PATENT DOCUMENTS

| | | | |
|---|---|---|---|
| 6,658,960 B2 * | 12/2003 | Babin et al. | 74/473.28 |
| 6,691,816 B2 * | 2/2004 | Houston | 180/336 |
| 6,723,934 B2 * | 4/2004 | Enright | 200/61.54 |
| 6,817,263 B2 * | 11/2004 | Miguchi | 74/473.3 |
| 6,857,499 B2 * | 2/2005 | Kawamoto et al. | 180/336 |
| 7,444,898 B2 * | 11/2008 | Beer et al. | 74/473.21 |
| 2002/0043057 A1 | 4/2002 | Shiba et al. | |
| 2004/0211617 A1 * | 10/2004 | Ogasawara et al. | 180/336 |
| 2006/0243505 A1 * | 11/2006 | Kuramoto et al. | 180/89.1 |

FOREIGN PATENT DOCUMENTS

| | | | |
|---|---|---|---|
| JP | 56160131U A | | 11/1981 |
| JP | 57138748U A | | 8/1982 |
| JP | 58136522 A | | 8/1983 |
| JP | 59187522U A | | 12/1984 |
| JP | 60 103026 | | 7/1985 |
| JP | 61153630U A | | 9/1986 |
| JP | 03005285 A | * | 1/1991 |
| JP | 3093649U A | | 9/1991 |
| JP | 3292280 A | | 12/1991 |
| JP | 06048204 A | * | 2/1994 |
| JP | 06-278490 | | 10/1994 |
| JP | 10100711 A | | 4/1998 |
| JP | 2000-170564 | | 6/2000 |
| JP | 2000-247240 | | 9/2000 |
| JP | 2001-130281 | | 5/2001 |
| JP | 2001-173779 | | 6/2001 |
| JP | 2002160545 A | | 6/2002 |
| JP | 2002257229 A | | 9/2002 |
| JP | 2003009608 A | | 1/2003 |
| JP | 2003-054283 | | 2/2003 |
| JP | 2003285662 A | | 10/2003 |
| JP | 2004-090885 | | 3/2004 |
| JP | 2004114964 A | | 4/2004 |
| JP | 2004-190697 | | 7/2004 |

* cited by examiner

SPEED SHIFT ARRANGEMENT FOR WORK VEHICLE

BACKGROUND OF THE INVENTION

The present invention relates to a speed shift device for a work vehicle such as a tractor.

The above shifting apparatus includes a shift lever is disposed to be rockable in a position laterally of a steering stem, so that the driver may, while looking in a traveling direction, operate the shift lever to change running speed, and that the shift lever hardly obstructs the driver boarding or alighting from a driving platform. A known shifting apparatus of this type is disclosed in Unexamined Utility Publication S60-103026 (pages 4 and 5, FIG. 3), for example.

A desired speed state may be obtained reliably by carrying out a shift operation appropriately while recognizing or confirming a current speed state of a propelling speed change device, or what speed state the speed change device is to switch. In this type of tractor, however, even if display means is provided for showing the speed state of the propelling speed change device, the display means may be difficult to see. Then, it will take time and a special movement of the driver to know from the display means to what speed state the propelling speed change device has switched or will switch. It is impossible to make full use of the construction having the shift lever disposed laterally of the steering stem.

SUMMARY OF THE INVENTION

The object of this invention is to provide a speed shift arrangement for a work vehicle, which enables a shifting operation to be carried out while promptly determining a speed state of a propelling speed change device while facilitating a forward and reverse drive switching of a vehicle body.

To attain the object, the work vehicle in accordance with the present invention comprises:

a plurality of wheels;

a propelling speed change device supported by the plurality of wheels and having at least one forward travel position and a reverse travel position with substantially the same speed reduction ratio as the forward travel position;

a steering wheel for steering at least one of the plurality of wheels;

a steering wheel support shaft for supporting the steering wheel;

a speed change lever located in a position laterally of the steering wheel support shaft and operatively connected to the propelling speed change device to operate the propelling speed change device;

a speed change lever guide for guiding the speed change lever, the guide including:

a plurality of fore and aft channels extending substantially in the fore and aft direction of the work vehicle;

a communication channel extending between the plurality of fore and aft channels;

wherein one of the plurality of the fore and aft channels has a first lever position corresponding to the forward travel position and a second lever position corresponding to the reverse travel position.

This arrangement allows the speed change lever to be located at a position conveniently accessed and easily seen by an operator. It also facilitates a forward and reverse operation of the vehicle simply by operating the speed change lever along one fore and aft channel.

DETAILED DESCRIPTION OF PREFERRED EMBODIMENTS

A plurality of embodiments of this invention will be described hereinafter with reference to the drawings. It is to be noted that a combination of characteristics disclosed in one embodiment and characteristics disclosed in another embodiment is also included in the scope of this invention.

A first embodiment of this invention will be described first.

Figure 1:
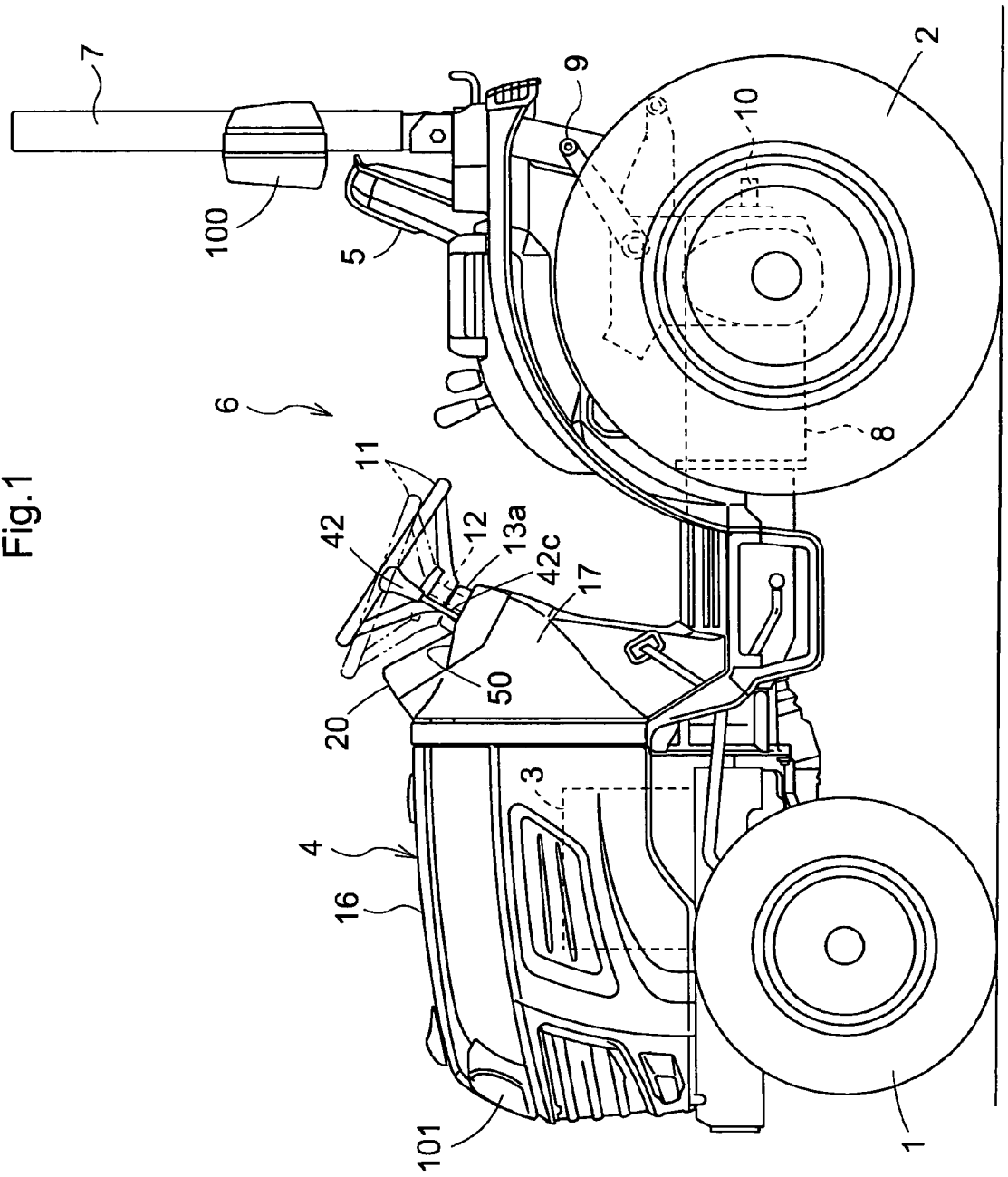
FIG. 1 is a side elevation of a tractor.

As shown in FIG. 1, a tractor (an example of a work vehicle) includes a self-propelled vehicle body having a pair of right and left dirigible front drive wheels 1, a pair of right and left rear drive wheels 2, a motor section 4 with an engine 3 mounted on a front portion of the vehicle body, a driving platform 6 with a driver's seat 5 disposed adjacent a rear end of the vehicle body, and a rollover protection frame 7 provided adjacent the rear of the driver's seat 5. A transmission case 8 forms a rear portion of a body frame of the vehicle body. A pair of right and left lift arms 9 are arranged above the transmission case 8 to be vertically swingable by a hydraulic cylinder (not shown) mounted in the transmission case 8. A power takeout shaft 10 projects from a rear wall of the transmission case 8, This tractor can form various types of riding work machines with various types of working implements connected thereto to be vertically movable and drivable. For example, a rotary plow may be connected to the rear of the body frame to be vertically movable by the lift arms 9, and with drive of the engine 3 transmitted from the power takeout shaft 10 to the rotary plow, whereby the tractor acts as a riding type tilling machine.

As shown in FIG. 1, the driving platform 6 includes a steering wheel 11 disposed forwardly of the driver's seat 5 and adjacent the rear of the motor section 4, and an operation panel 20 disposed below and adjacent the steering wheel 11.

Figure 2:
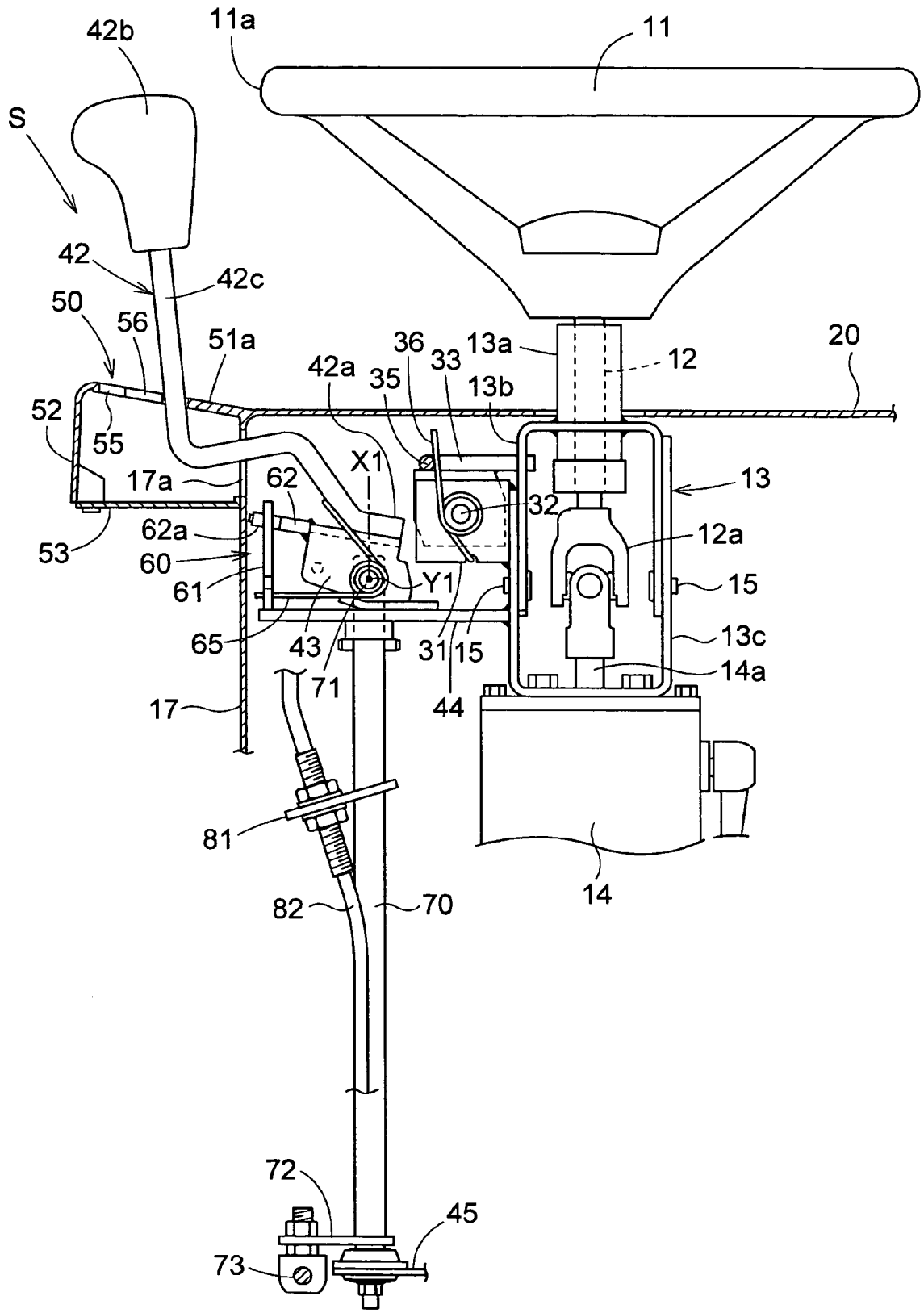
FIG. 2 is a rear view of a structure for arranging a shift lever and a steering wheel.

As shown in FIG. 2, the steering wheel 11 is rotatably supported by a tube 13a of a steering column 13 through a steering wheel support shaft 12 connected at an upper end thereof to the steering wheel 11 to be rotatable together. The steering wheel support shaft 12 is connected to an input shaft 14a of a power steering device 14 to which the steering column 13 is connected and which acts as a support base of the steering column 13.

Figure 3:
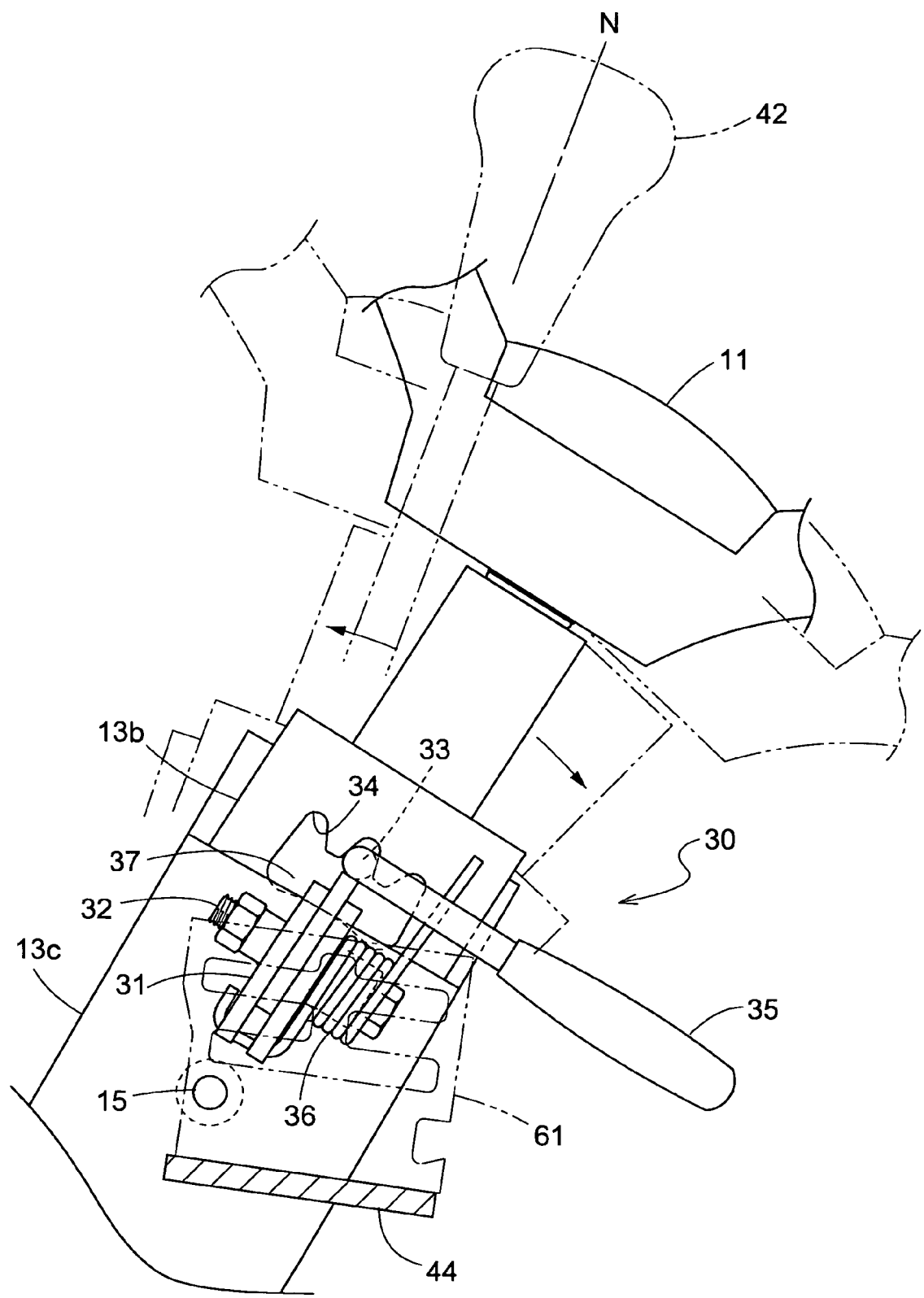
FIG. 3 is a side view of a tilt lock mechanism.

As shown in FIGS. 2 and 3, the steering wheel support shaft 12 and the input shaft 14a of the power steering device 14 are connected through a universal joint 12a, and a steering wheel side member 13b having the tube 13a of the steering column 13 is connected to a base side member 13c fixed to the power steering device 14, to be pivotable through connecting pins 15 arranged transversely of the vehicle body. A tilt lock mechanism 30 is provided which includes a tilt lock shaft 33 rockably supported through a connecting pin 32 by a bracket 31 fixed to the base side member 13c, and a plurality of lock recesses 34 formed in the steering wheel side member 13b of the steering column 13.

A lock release lever 35 extending from the tilt lock shaft 33 to be rockable together is biased by a lock spring 36, whereby the tilt lock shaft 33 is biased to rock with the lock release lever 35 about the axis of the connecting pin 32. With the tip end of the tilt lock shaft 33 entering one of the plurality of lock recesses 34, the tilt lock mechanism 30 assumes a locking position for locking the steering wheel side member 13b not to swing relative to the base side member 13c, thereby locking the steering wheel 11 to be untiltable. When the lock release lever 35 is rocked against the lock spring 36, the tilt lock shaft 33 is rocked with the lock release lever 35 about the axis of the connecting pin 32, whereby the tip end of the tilt lock shaft 33 disengages from the lock recess 34 to lie inside a slot 37. Then, the tilt lock mechanism 30 assumes a lock release position for allowing the steering wheel side member 13b to swing relative to the base side member 13c about the axis of the connecting pins 15 extending transversely of the vehicle body, thereby rendering the steering wheel 11 tiltable.

That is, the steering wheel 11 is turned about the axis of the steering wheel support shaft 12 to operate the power steering device 14. Through the power steering device 14 the right and left front wheels 1 are turned to a steering position corresponding to an operated position of the steering wheel 11. As a rocking force is applied to the steering wheel 11 while operating the tilt lock mechanism 30 to the lock release position with the lock release lever 35, the steering wheel 11 swings with the steering wheel side member 13b about the axis of the connecting pins 15, to tilt toward or away from the driver's seat 5. That is, the steering wheel 11 is supported with a mounting angle thereof adjustable in the fore and aft direction of the vehicle body about the axis of the connecting pins 15. The steering wheel 11 is a tilt wheel capable of position changing between a mounting position close to the driver's seat 5 and a mounting position forwardly remote from the driver's seat 5.

Figure 4:
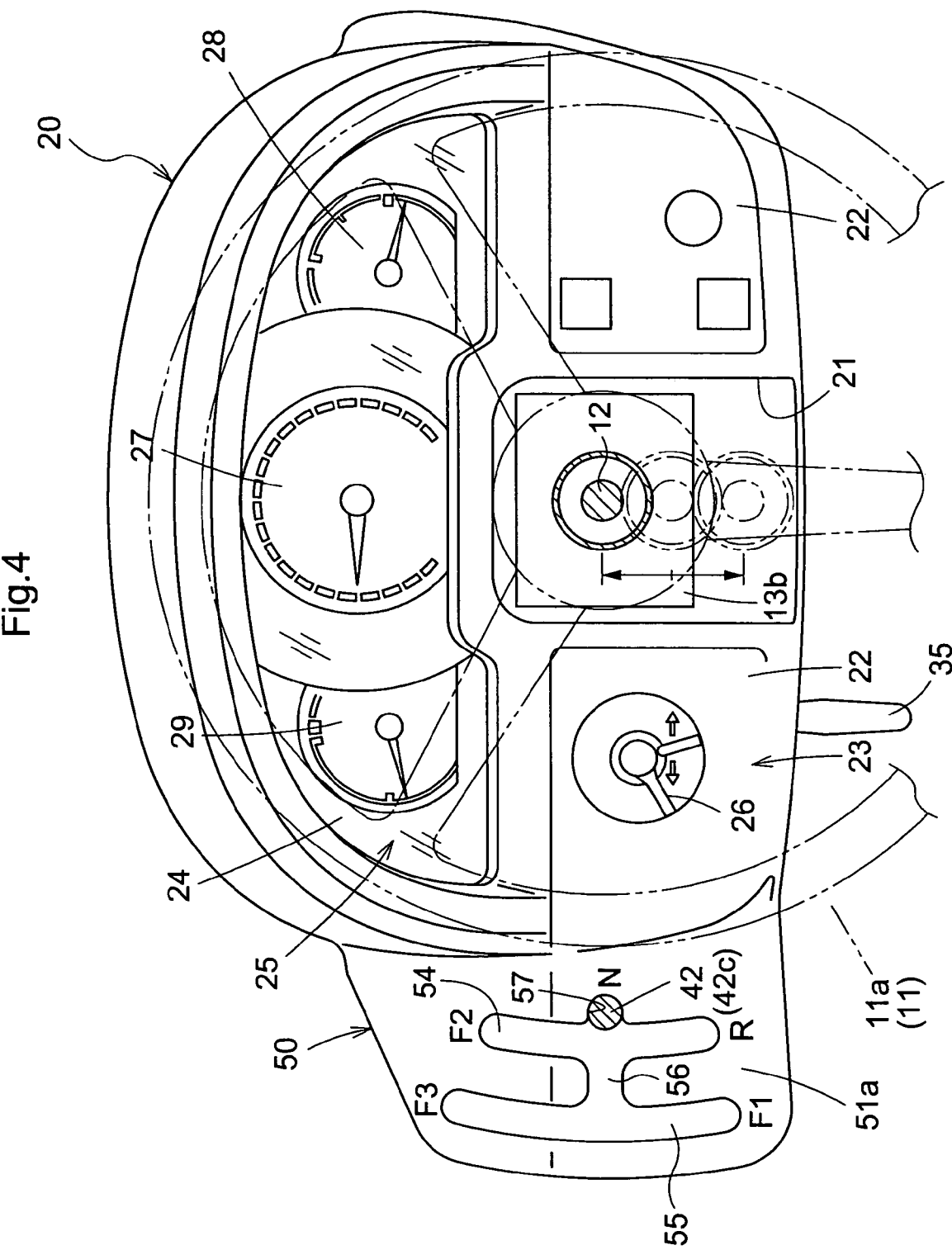
FIG. 4 is a plan view of a steering wheel arranging portion.
Figure 5:
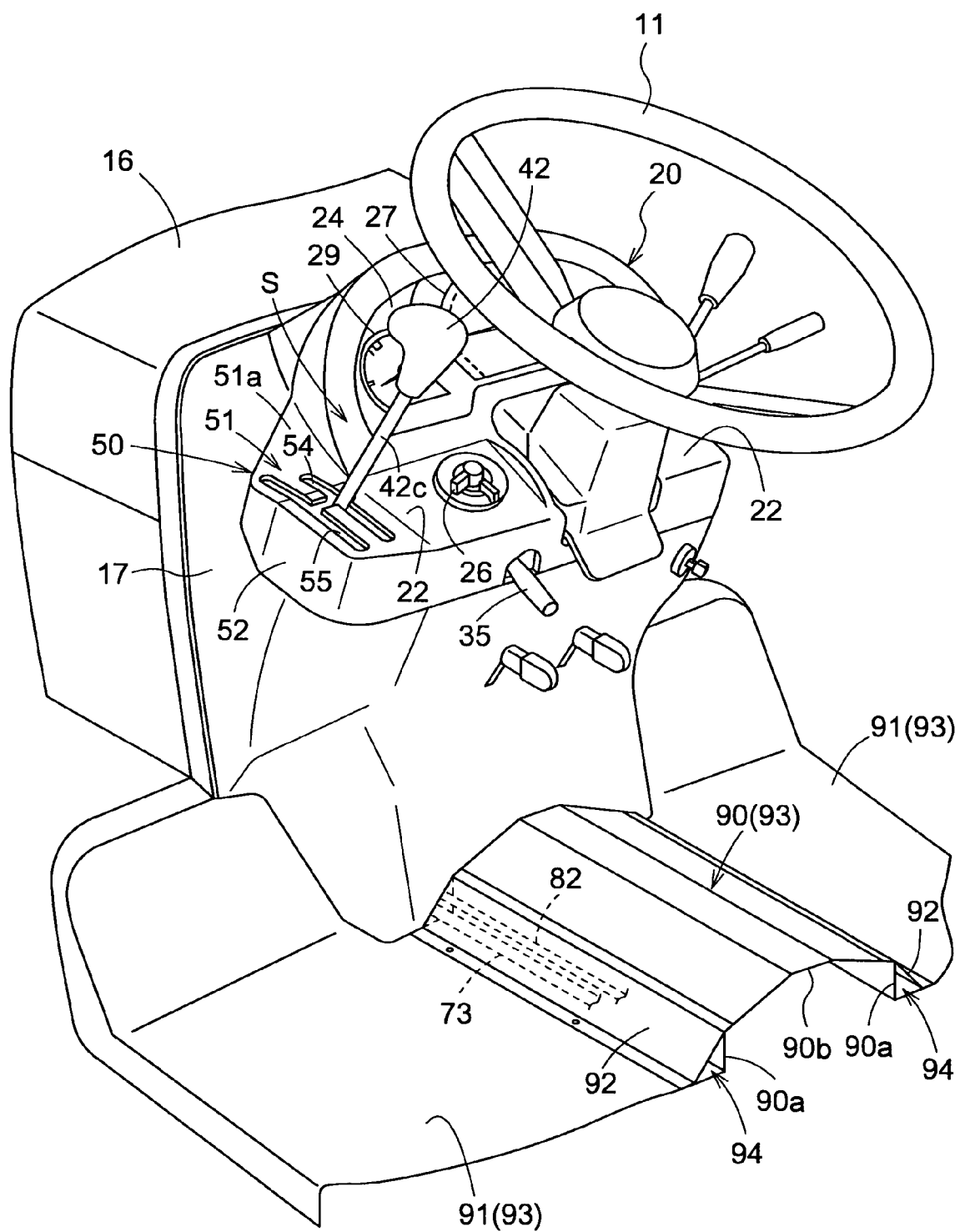
FIG. 5 is a perspective view of a driving platform.

As shown in FIGS. 1, 2 and so on, the operation panel 20 is connected to a vehicle body outer wall 17 formed of sheet metal and defining an inner space at the rear of an engine hood 16 of the motor section 4 for accommodating the power steering device 14 and other components. As shown in FIGS. 4, 5 and so on, the operation panel 20 includes a switch board portion 23 with a pair of right and left switch board faces 22 distributed to opposite sides of a through-hole 21 penetrated by the steering column 13, and an instrument board portion 25 with an instrument board face 24 located forwardly of the switch board portion 23. One switch board face 22 of the switch board portion 23 has a combination switch 26 for operating a horn (not shown), direction indicators 100 (FIG. 1) and headlights 101 (FIG. 1). The instrument board face 24 of the instrument board portion 25 forms a slope inclined progressively upward as it extends forward, at a steeper angle than the switch board face 22. The instrument board face 24 has an engine speed indicator 27, fuel gauge 28 for the engine and a thermometer 29 of engine cooling water.

Figure 6:
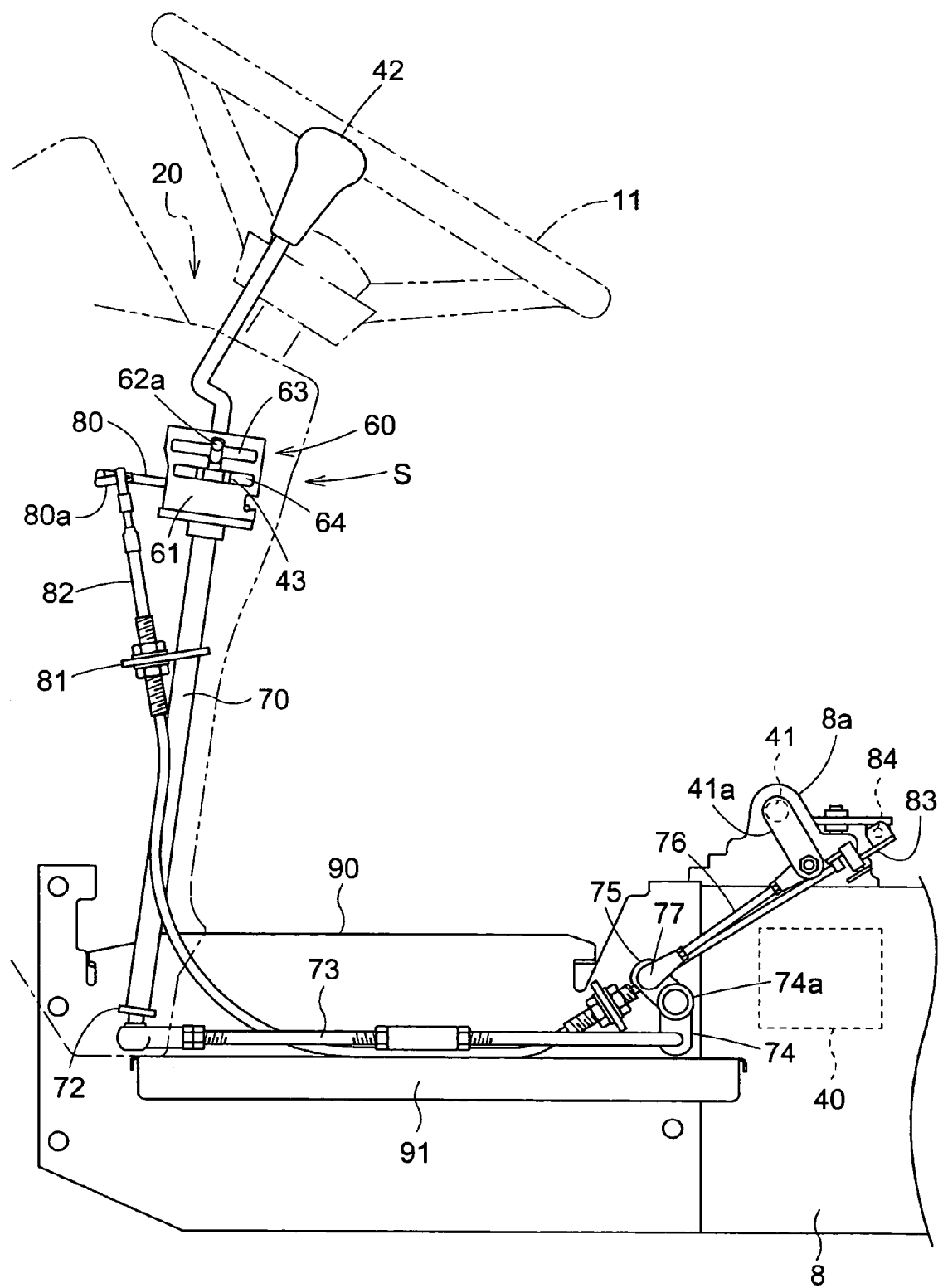
FIG. 6 is a side view showing an interlocking structure of the shift lever and a propelling speed change device.
Figure 7:
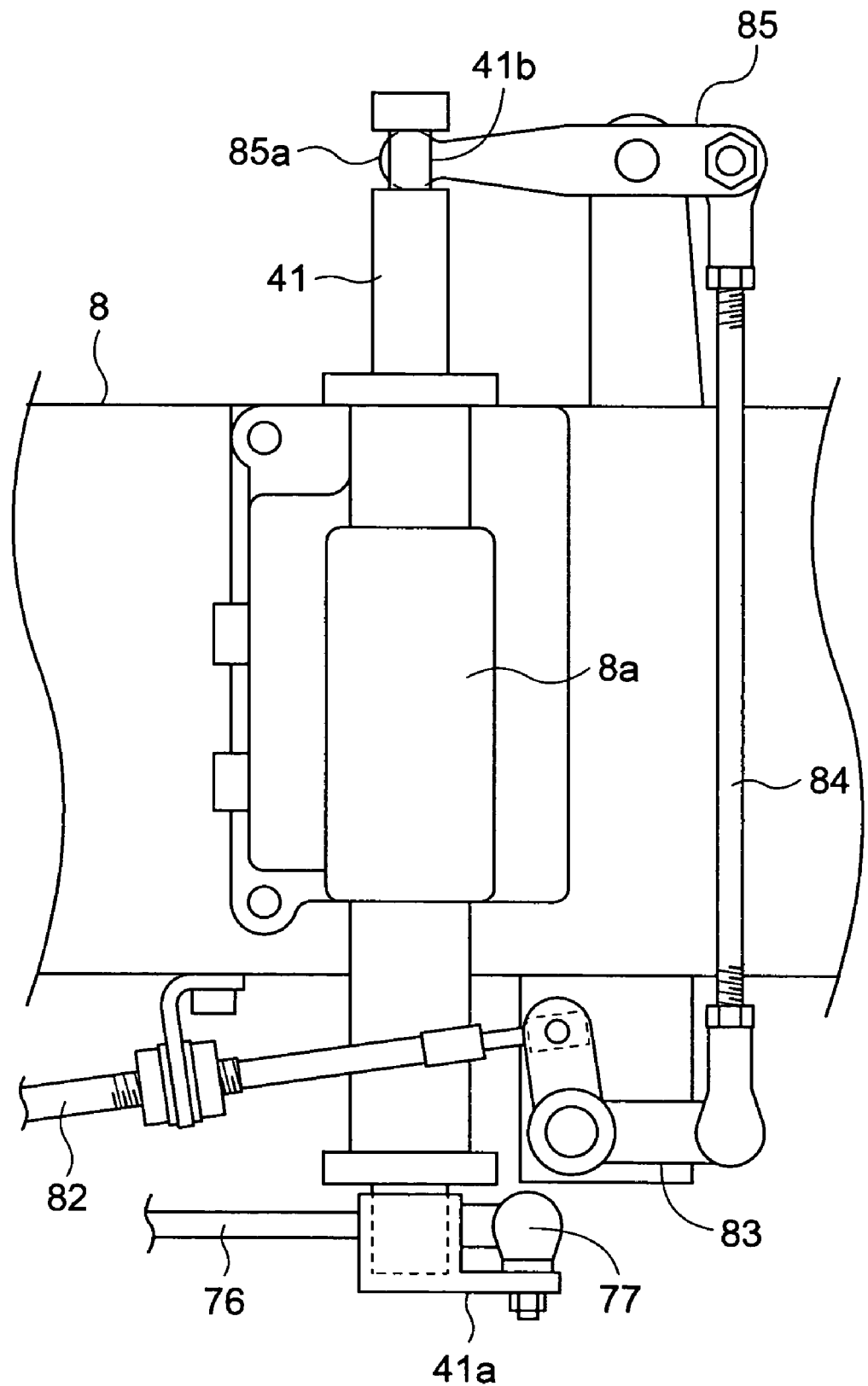
FIG. 7 is a plan view of a shift control unit of the propelling speed change device.

The transmission case 8 contains a gear type propelling speed change device 40 shiftable by engagement and disengagement of a shift gear (not shown). The speed change device 40 is switchable to provide a total of four speed stages, including three forward speed positions and one backward speed position, by rotation and sliding of a shifting unit 41 in the form of a control shaft rotatably and slidably supported at an upper end 8a of the transmission case 8 as shown in FIGS. 6 and 7. The propelling speed change device 40 is constructed to provide, in a backward driving state (or the reverse position), a running speed value for driving the self-propelled vehicle body backward, and in a second forward driving state (a forward traveling position), a running speed value equal or close to the above speed value for driving the self-propelled vehicle body forward. This is because the reduction ratios (reduction in the rotational speed of an output with respect to the rotational speed of the input) of the speed change device 40 for this particular forward position and the reverse position are equal or approximately equal.

The propelling speed change device 40 is shiftable by a shifting apparatus S having a shift lever 42 located adjacent the steering wheel 11 as shown in FIG. 5 and so on.

As shown in FIGS. 2, 5 and so on, the shifting apparatus S includes, besides the shift lever 42, a lever guide 50 disposed laterally of the operation panel 20, and a lever positioning mechanism 60 disposed below the operation panel 20 and inwardly of the vehicle body outer wall 17.

As shown in FIG. 2, the shift lever 42 extends through a through-hole 17a of the vehicle body outer wall 17, with a proximal portion 42a of the shift lever 42 located inwardly of the vehicle body vehicle body outer wall 17, and a distal portion having a handgrip 42b of the shift lever 42 located outwardly of the vehicle body outer wall 17. The handgrip 42b of the shift lever 42 is located adjacent a peripheral edge 11a of the steering wheel 11 (in a location spaced about 10 mm laterally outwardly of the vehicle body from the peripheral edge 11a of the steering wheel 11).

The shift lever 42 has a connecting member 43 fixed to the proximal portion 42a thereof, and connected through a connecting shaft 71 to an upper end of an interlocking shaft 70 extending vertically of the vehicle body. The interlocking shaft 70 is rotatably supported by a support 44 fixed to the base side member 13c of the steering column 13, and projects upward from the support 44. The shift lever 42 is rockably supported in a position laterally of the steering wheel support shaft 12 and inwardly of the vehicle body outer wall 17 to be rockable about an axis X extending vertically of the interlocking shaft 70 and also about an axis Y of the connecting shaft 71 (i.e. an axis perpendicular to the axis X).

As shown in FIGS. 2, 6, 7 and so on, the proximal portion 42a of the shift lever 42 is interlocked to a speed change arm 41a connected to one end of the shifting unit 41, through the connecting member 43, the interlocking shaft 70, an interlocking arm 72 connected to, to be pivotable with, the interlocking shaft 70 adjacent a bracket 45 rotatably supporting the lower end of the interlocking shaft 70, an interlocking rod 73 extending longitudinally of the vehicle body and having a forward end connected to the interlocking arm 72, a pivot link 74 connected to a rear end of the interlocking rod 73, a pivot link 75 extending from a boss portion 74a of the pivot link 74 to be pivotable therewith, and an interlocking rod 76 interlocking the pivot link 75 to the speed change arm 41a. Thus, the shift lever 42 is interlocked to the shifting unit 41 such that a rocking operation about the axis X of the shift lever 42 rotates the shifting unit 41.

The interlocking rod 76 is connected to the pivot link 75 and speed change arm 41a through a joint 77 having a spherical surface. When the shifting unit 41 is slid, the deflecting action of the joint 77 absorbs movement of the speed change arm 41a transversely of the vehicle body relative to the pivot link 75.

Figure 8:
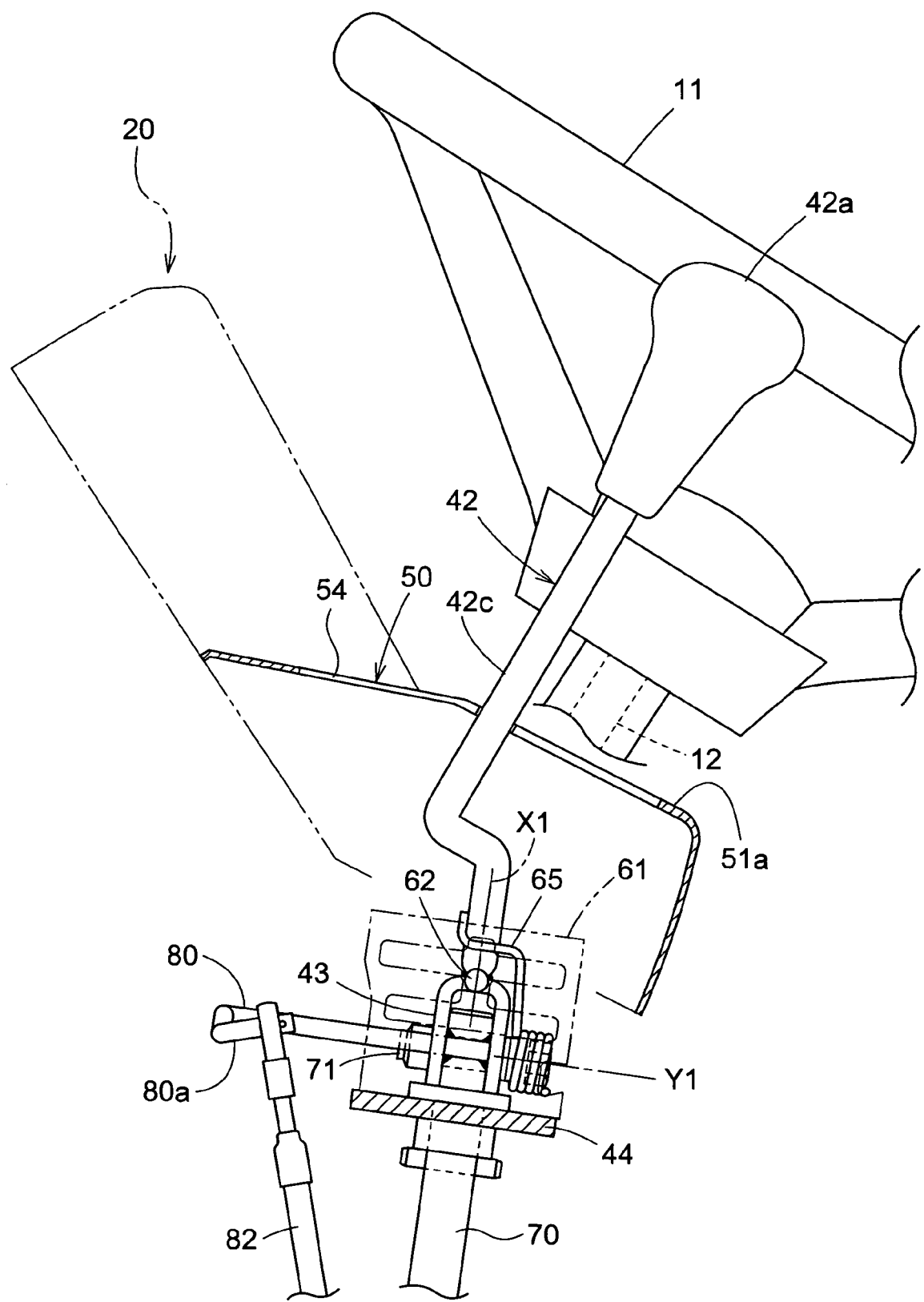
FIG. 8 is a side view in vertical section of a lever guide.

As shown in FIGS. 6, 7, 8 and so on, the proximal portion 42a of the shift lever 42 is interlocked to the shifting unit 41 through a control arm 80 extending forward from the connecting member 43 of the shift lever 42, a push-pull control cable 82 having a forward end of an inner cable connected to a bent end 80a at the extending end of the control arm 80, and a forward end of an outer cable supported by a support member 81 supported by the interlocking shaft 70, to be rotatable therewith, a pivot link 83 connected to the rear end of the inner cable of the control cable 82, an interlocking rod 84 extending transversely of the vehicle body and having one end thereof connected to the pivot link 83, and a shift link 85 having one end thereof connected to the other end of the interlocking rod 84, and an operating end 85a at the other end engaged in an annular groove 41b of the shifting unit 41. Thus, the shift lever 42 is interlocked to the shifting unit 41 such that a rocking operation about the axis Y of the shift lever 42 slides the shifting unit 41.

Figure 10:
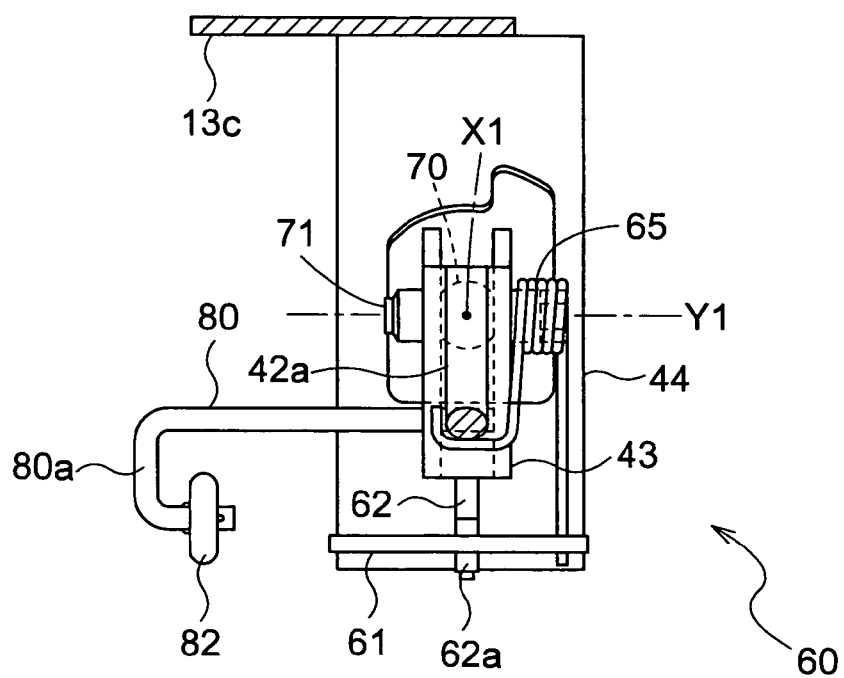
FIG. 10 is a plan view of a shift lever support unit.

As shown in FIGS. 2, 6, 10 and so on, the lever positioning mechanism 60 includes a positioning plate 61 fixed to the support 44, a positioning bar 62 extending from the connecting member 43, and a spring 65 for biasing the shift lever 42 to bias the positioning bar 62, thereby bias a working element 62a in the form of a roller at a distal end of the positioning bar 62 against inner walls of fore and aft guide grooves 63 and 64 in the position plate 61.

Figure 9:
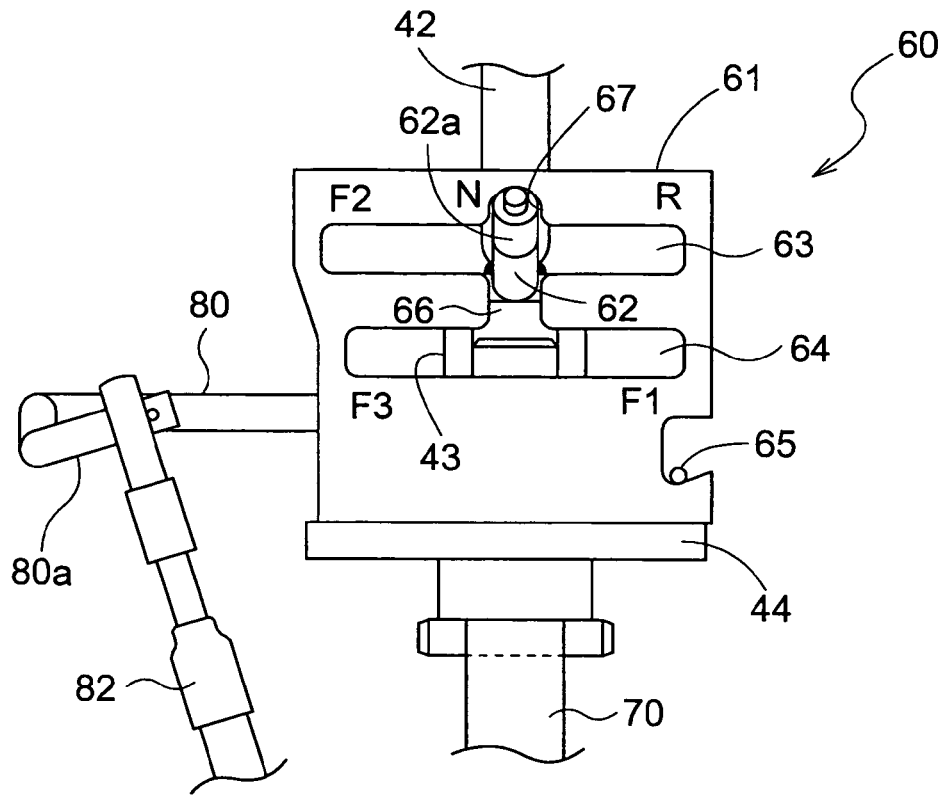
FIG. 9 is a side view of a positioning mechanism.

Specifically, as clearly shown in FIG. 9, the positioning plate 61 has a pair of fore and aft guide grooves 63 and 64 elongated in the fore and aft direction of the vehicle body, a communicating groove 66 for communicating the pair of fore and aft guide grooves 63 and 64, and a cutout 67 opening to one fore and aft guide groove 63. The lever positioning mechanism 60, with the working element 62a of the positioning bar 62 moving along one fore and aft guide groove 63 or the other fore and aft guide 64, guides the shift lever 42 to rock about the axis X, with the working element 62a of the positioning bar 62 moving along the communicating groove 66, guides the lever 42 to rock about the axis Y, and with the working element 62a of the positioning bar 62 lying in a predetermined position in each of the guide grooves 63 and 64 or in the cutout 67, positions the shift lever 42 in one of control positions R, F1, F2, F3 and N shown in FIG. 4.

Specifically, the shift lever 42 is positioned in a reverse position R when the working element 62a of the positioning bar 62 is located at a rear end of one fore and aft guide groove 63. The shift lever 42 is positioned in a second forward speed position F2 when the working element 62a of the positioning bar 62 is located at a forward end of one fore and aft guide groove 63. The shift lever 42 is positioned in a first forward speed position F1 when the working element 62a of the positioning bar 62 is located at a rear end of the other fore and aft guide groove 64. The shift lever 42 is positioned in a third forward speed position F3 when the working element 62a of the positioning bar 62 is located at a forward end of the other fore and aft guide groove 64. The shift lever 42 is positioned in a neutral position N when the working element 62a of the positioning bar 62 is located in the cutout 67.

As shown in FIGS. 2, 4 and 5, the lever guide 50 includes a guide board portion 51 having a surface 51a extending upward, and a vertical wall portion 52 continuous with an edge of the guide board portion 51. The upward extending surface 51a of the guide board portion 51 is formed integrally with a side of the operation panel 20 and protruding laterally outward of the peripheral edge 11a of the steering wheel 11, as seen in a direction along the axis of the steering wheel support shaft 12 of the steering wheel 11. The lever guide 50 has a bottom opening closed with a bottom lid 53. The bottom lid 53 is supported by the vehicle body outer wall 17.

The lever guide 50 has the following further features. The upward extending surface 51a of the guide board portion 51 has a region including the reverse position R, second forward speed position F2 and neutral position N, parallel or almost parallel to the switch board face 22 of the operation panel 20 and located on the same or almost the same plane as the switch board face 22.

As clearly shown in FIG. 4, the guide board portion 51 of the lever guide 50 has a plurality of fore and aft channels 54 and 55 extending longitudinally of the vehicle body and arranged transversely of the vehicle body, which are communication through a communication channel 56 extending transversely of the vehicle body. These fore and aft channels 54 and 55 and communication channel 56 define control channels for receiving a vertical rod portion 42c between the proximal portion 42a and handgrip 42b of the shift lever 42.

Specifically, the inwardly located fore and after channel 54 of the plurality of fore and aft channels 54 and 55 defines a control channel along which the vertical rod portion 42c of the shift lever 42 moves when the shift lever 42 rocks as guided by one fore and aft guide groove 63 of the lever positioning mechanism 60, that is when the shift lever 42 is rocked about the axis Y to switch to the second forward speed position F2 and reverse position R. The outwardly located fore and after channel 55 of the plurality of fore and aft channels 54 and 55 defines a control channel along which the vertical rod portion 42c of the shift lever 42 moves when the shift lever 42 rocks as guided by the other fore and aft guide groove 64 of the lever positioning mechanism 60, that is when the shift lever 42 is rocked about the axis X to switch to the first forward speed position F1 and third forward speed position F3. The communication channel 56 defines a control channel along which the vertical rod portion 42c of the shift lever 42 moves when the shift lever 42 rocks along the communicating groove 66 of the lever positioning mechanism 60, that is when the shift lever 42 is rocked about the axis Y to move from one to the other of the control channels 54 and 55.

That is, when the shift lever 42 is rocked about the axis Y inwardly or outwardly of the vehicle body along the communication channel 56 of the lever guide 50 to place the shift lever 42 in the inward control channel 54 or outward control channel 55, the control arm 80 pivots about the axis Y to push or pulls the control cable 82. The control cable 82 causes, through the pivot link 83 and interlocking rod 84, pivoting of the shift link 85. Then, the shift link 85 slides the shifting unit 41, thereby to select a shift gear of the propelling speed change device 40.

When the shift lever 42 located in the inward control channel 54 is rocked about the axis X along this control channel 54 longitudinally of the vehicle body, the interlocking shaft 70 is rotated to push or pull the interlocking rod 76 through the interlocking arm 72, interlocking rod 73, pivot link 74 and pivot link 75. The interlocking rod 76 swings the speed change arm 41a, which rotates the shifting unit 41 to shift the selected shift gear. As a result, the propelling speed change device 40 is shifted to a reverse drive state or to a second forward speed state faster than a first forward speed state. When the shift lever 42 is operated to the reverse position R located at the rear end of the control channel 54 at this time, the propelling speed change device 40 will be in the reverse drive state. When the shift lever 42 is operated to the second forward speed position F2 located at the forward end of the control channel 54, the propelling speed change device 40 will be in the second forward speed state.

When the shift lever 42 located in the outward control channel 55 is rocked about the axis X along this control channel 55 longitudinally of the vehicle body, the interlocking shaft 70 is rotated to push or pull the interlocking rod 76 through the interlocking arm 72, interlocking rod 73, pivot link 74 and pivot link 75. The interlocking rod 76 swings the speed change arm 41a, which rotates the shifting unit 41 to shift the selected shift gear. As a result, the propelling speed change device 40 is shifted to a first forward speed state or to a third forward speed state. When the shift lever 42 is operated to the first forward speed position F1 located at the rear end of the control channel 55 at this time, the propelling speed change device 40 will be in the first forward speed state. When the shift lever 42 is operated to the third forward speed position F3 located at the forward end of the control channel 55, the propelling speed change device 40 will be in the third forward speed state faster than the second forward speed state.

The running speed value in time of the self-propelled vehicle body traveling backward with the propelling speed change device 40 placed in the reverse drive state by the shift lever 42 operated to the reverse position R is equal or close to the running speed value in time of the self-propelled vehicle body traveling forward with the propelling speed change device 40 placed in the second forward speed state by the shift lever 42 operated to the second forward speed position F2. Thus, even when the propelling speed change device 40 is shifted to the second forward speed state, the self-propelled vehicle body can be started without causing an engine stall. By rocking the shift lever 42 along the control channel 54 to switch between the reverse position R and second forward speed position F2, the self-propelled vehicle body is switchable between forward traveling and backward traveling. The shift lever 42 is biased by the spring 65 toward the inward control channel 54. Thus, the shift lever 42 is switchable between the reverse position R and second forward speed position F2, without requiring special effort to retain the shift lever 42 in the control channel 54 when the shift lever 42 moves adjacent the communication channel 56.

The propelling speed change device 40 becomes neutral state when the shift lever 42 is placed in a cutout 57 formed in the guide board face 51a of the lever guide 50 to open to the inward control channel 54. At this time, the shift lever 42 is retained in the cutout 57 by the biasing force of the spring 65, to maintain the propelling speed change device 40 in neutral.

Figure 11:
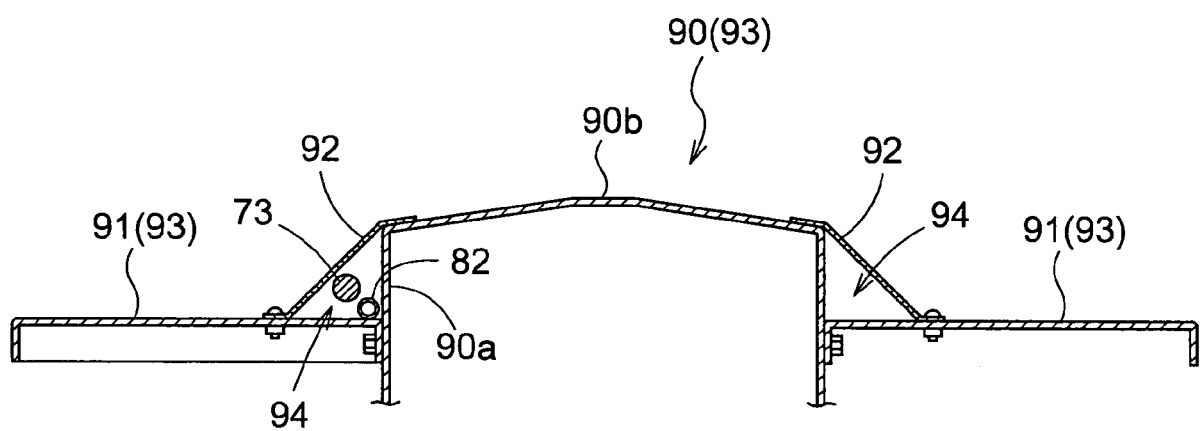
FIG. 11 is a sectional view of foot rests.

As shown in FIGS. 5, 11 and so on, a footrest 93 is formed of a driving case 90 covering a transmission line for transmitting output from an output shaft of the engine 3 to the transmission case 8, and step plates 91 connected to opposite side walls 90a of the driving case 90. The interlocking rod 73 and control cable 82 are arranged on one of the step plates of the footrest 93 to extend longitudinally of the vehicle body along a side wall 90a of the driving case 90, and along a corner of one of a pair of right and left stepped sections 94 formed in middle regions of the footrest 93 transversely of the vehicle body by the driving case 90 and step plates 91. A cover 92 formed of sheet metal is provided for each of the stepped sections 94 as inclined from an upper wall 90b of the driving case 90 acting as a step located at a high level of the stepped section 94 to the step plate 91 acting as a step located at a low level. The cover 92 covers the interlocking rod 73 and control cable 82.

As shown in FIG. 4, the steering wheel 11 with the mounting angle thereof adjustable in the fore and aft direction of the vehicle body may be adjusted to a forward limit position with respect to the vehicle body. The neutral position N is set such that, when the steering wheel 11 is adjusted to the above position and the shift lever 42 is operated to the neutral position N, the shift lever 42 is aligned with the steering wheel support shaft 12 of the steering wheel 11 transversely of the vehicle body as seen along the axis of the steering wheel support shaft 12.

That is, the driver can board or alight from the tractor after adjusting the angle of the steering wheel 11 to set the latter to the forward limit position, so that the steering wheel 11 is at a maximum distance forward from the driver's seat 5, thereby hardly obstructing the movement of the driver. Since the shift lever 42 is operated to the neutral position N to place the propelling speed change device 40 in neutral state in time of boarding and alighting, the shift lever 42 also hardly obstructs the movement of the driver.

In the above embodiment, the neutral position N is set such that, when the angle of the steering wheel 11 is adjusted to set the latter to the forward limit position, the shift lever 42 operated to the neutral position N is aligned with the steering wheel support shaft 12 transversely of the vehicle body. Instead, the neutral position N may be set such that, when the angle of the steering wheel 11 is adjusted to set the latter to the forward limit position, the shift lever 42 operated to the neutral position N is located forwardly of the steering wheel support shaft 12. In this case also, the object of this invention can be fulfilled.

Next, a second embodiment of this invention will be described.

In this embodiment, the operating direction of the shift lever is different from the operating direction in the first embodiment.

Figure 12:
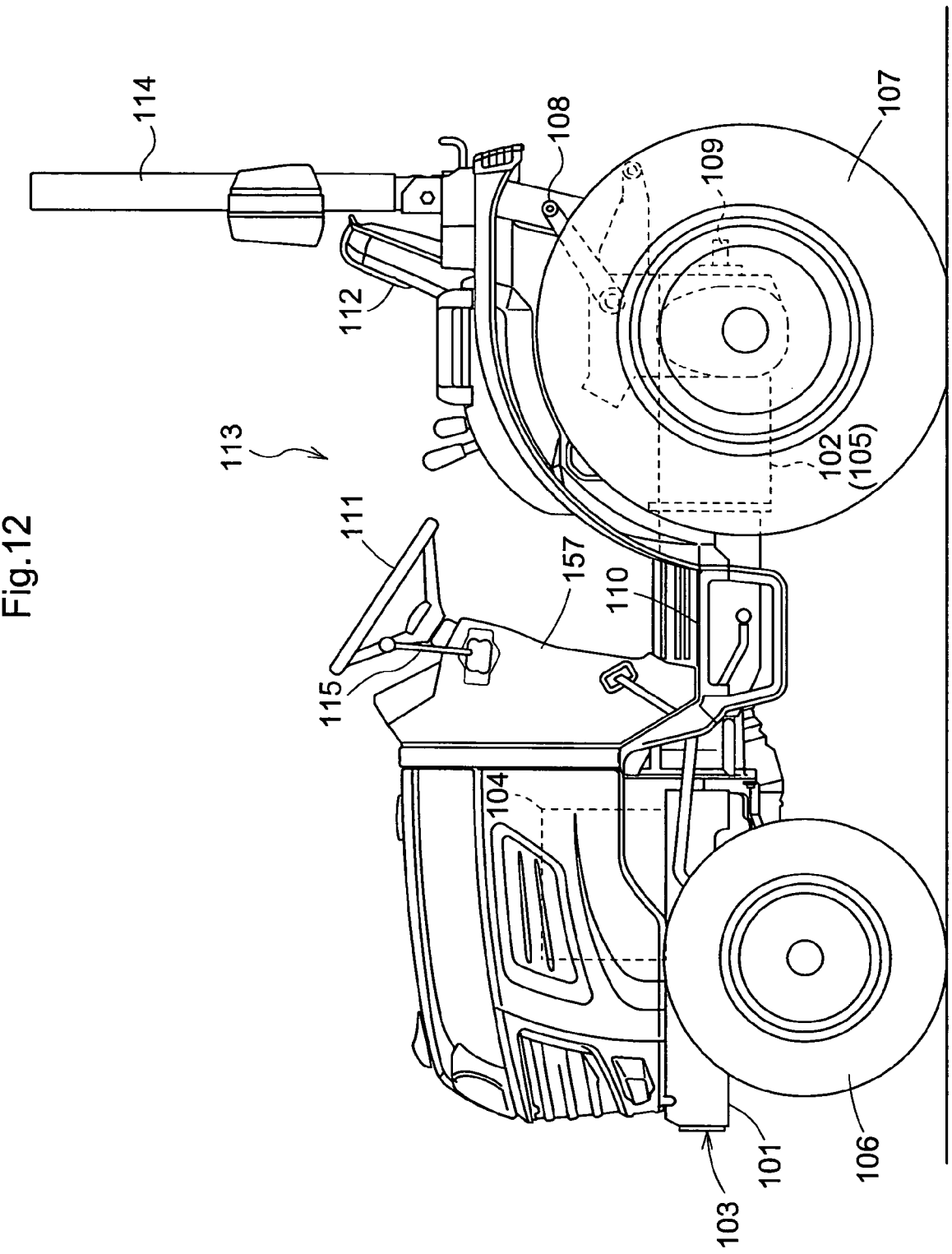
FIG. 12 is a side elevation of a tractor.

FIG. 12 shows a side elevation of a tractor which is one example of working vehicles. The tractor includes a front frame 101, and a transmission case 102 serving also as a rear frame, constituting a body frame 103. This is a four-wheel drive tractor in which power of an engine 104 mounted with vibration isolation on a front portion of the body frame 103 is transmitted through a gear type propelling speed change device 105 mounted in the transmission case 102 to right and left front wheels 106 and rear wheels 107.

The transmission case 102 has, arranged on the rear portions thereof, a pair of right and left lift arms 108 vertically swingable by a hydraulic lift cylinder (not shown) mounted in the transmission case 8, and a power takeout shaft 109 for taking out engine power.

A driving platform 113 is formed on a rear portion of the vehicle body frame 103, including a boarding step 110, a steering wheel 111 and a driver's seat 112. A protection frame 114 (ROPS) is erected rearwardly of the driver's seat 112 on the driving platform 113, which includes two struts extending vertically, and a horizontal member extending between the two struts.

Although not shown, the right and left lift arms 108 have a link mechanism vertically swingably connected to the rear of the transmission case 102. An input shaft of a working implement such as a rotary plow connected to the link mechanism is connected through a transmission shaft to the power take-out shaft 109.

As shown in FIGS. 12 through 22, the gear type speed change device 105 has a shift control shaft 116 operatively connected through two link mechanisms 117 and 118 to a shift lever (an example of control lever) 115 disposed to the left of the steering wheel 111. Thus, the speed change device 105 is shiftable by rocking the shift lever 115 to provide three forward speeds and one backward speed.

Figure 18:
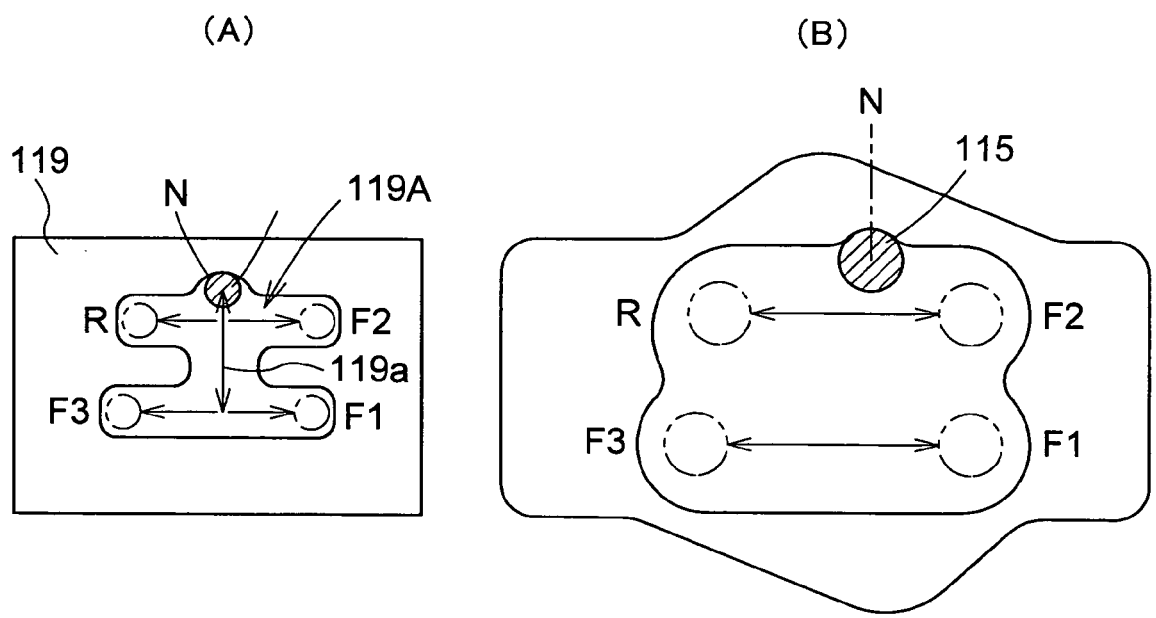
FIG. 18 is a view showing operating paths of the shift lever.

As best shown in FIG. 18 (A), the shift lever 115 is rockable along a guide groove 119A formed in a guide plate 119 extending substantially vertically. The guide groove 119A is approximately H-shaped turned sideways. A neutral position N is located at an upper end of a selection channel 119a extending vertically. A first forward speed position F1 is located at a rear end at the bottom of the selection channel 119a. A second forward speed position F2 is located at a rear end of a predetermined intermediate part of the selection channel 119a. A third forward speed position F3 is located at a forward end of the bottom of the selection channel 119a. A reverse position R is located at a forward end of the predetermined intermediate part of the selection channel 119a.

The shift control shaft 116 is disposed to extend transversely through an upper portion of the transmission case 102. When the shift lever 115 is rocked vertically along the selection channel 119a of the guide groove 119A, this operation is transmitted through the first link mechanism 117 of the two link mechanisms 117 and 118, to slide the shift control shaft 116 in the direction of its axis X2 (i.e. in the transverse direction). When the shift lever 115 is rocked fore and aft between the selection channel 119a and first forward speed position F1, second forward speed position F2, third forward speed position F3 or reverse position R, this operation is transmitted through the second link mechanism 118 of the two link mechanisms 117 and 118, to rotate the shift control shaft 116 about the axis X2.

Figure 21:
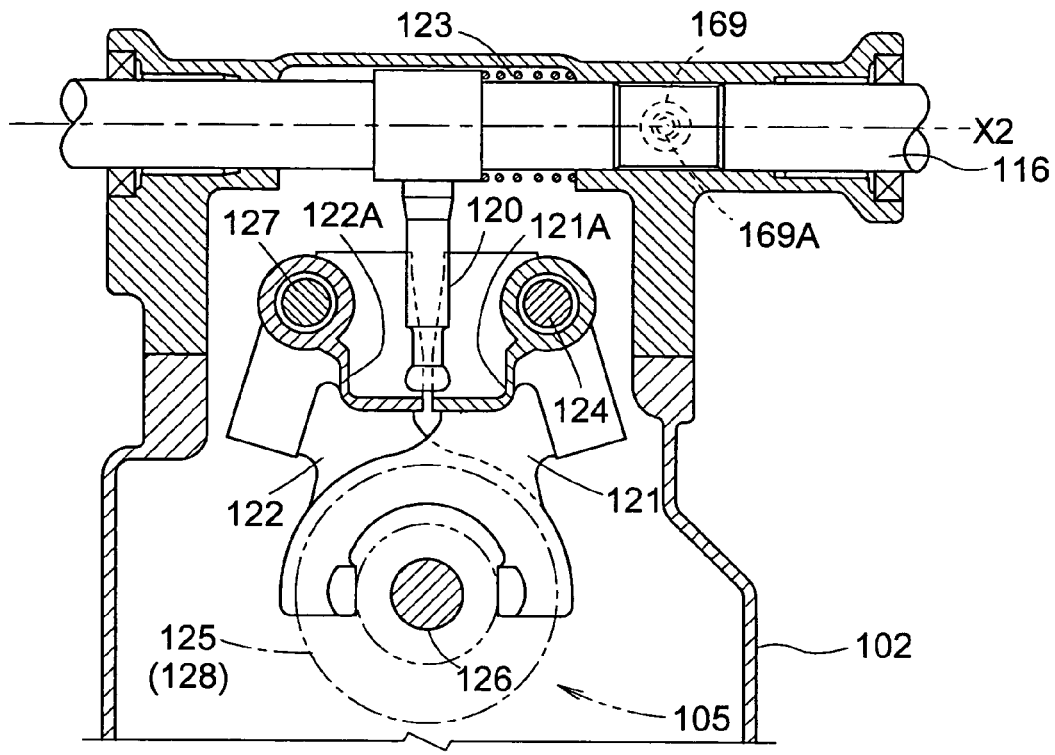
FIG. 21 is a front view in vertical section the speed control shaft and adjacent components of the shift operation structure.
Figure 22:
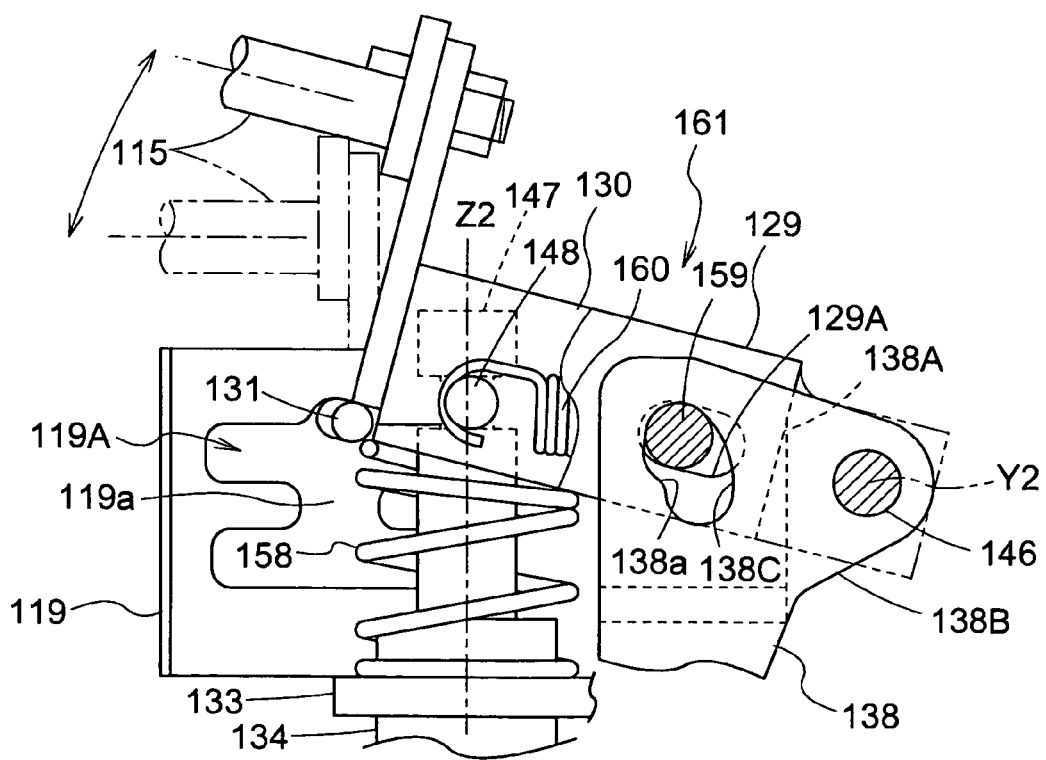
FIG. 22 is a rear view in vertical section of a principal portion showing a construction of operation resistance applying means.

As shown in FIG. 21, the gear type speed change device 105 has a control shaft 120 rigidly attached to the shift control shaft 116. When the shift control shaft 116 slides transversely of the vehicle body, the control shaft 120 is switched between a state of engaging an engaging recess 121A of a first shifting fork 121 and a state of engaging an engaging recess 122A of a second shifting fork 122. This switching can take place only in a neutral state of the gear type speed change device 104 when the engaging recess 121A of the first shifting fork 121 and the engaging recess 122A of the second shifting fork 122 are arranged transversely to communicate with each other.

Figure 19:
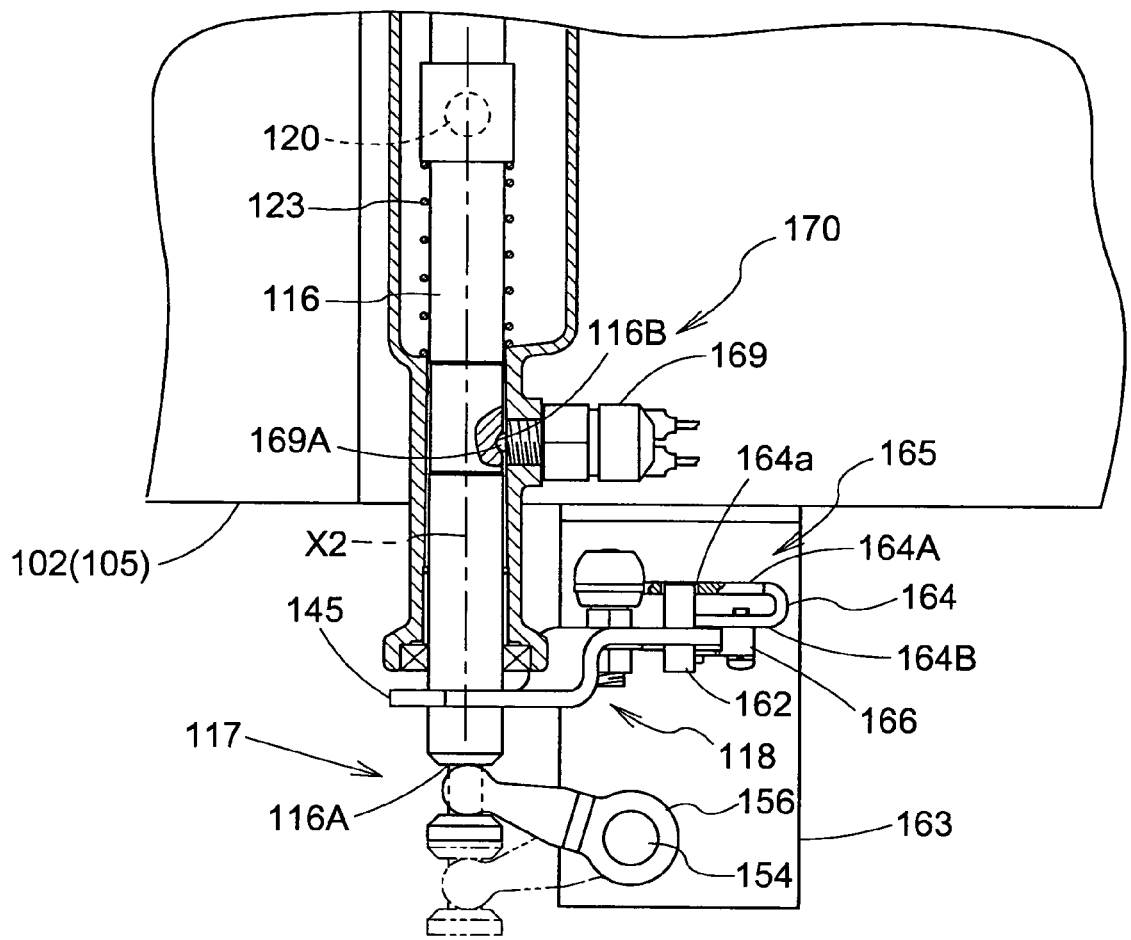
FIG. 19 is a plan view in cross section of a speed control shaft and adjacent components of the shift operation structure.

As shown in FIGS. 19 and 21, the shift control shaft 116 has a push spring 123 mounted thereon for biasing the shift control shaft 116 rightward. When the shift control shaft 116 is slide leftward against the biasing of the push spring 123, the control shaft 120 engages the engaging recess 121A of the first shifting fork 121.

When the shift control shaft 116 is rotated forward about the axis X2 in this state of engagement, the control shaft 120 swings rearward, the first shifting fork 121 slides rearward along a first guide shaft 124 extending fore and aft, and a first shift gear 125 slidable with the first shifting fork 121 slides rearward along a support shaft 126 extending fore and aft. The first shift gear 125 meshes with a forward drive low speed gear (not shown) disposed in a rearward position. This produces a first forward speed state of the gear type speed change device 105.

Conversely, when the shift control shaft 116 is rotated rearward about the axis X2 in the above state of engagement, the control shaft 120 swings forward, the first shifting fork 121 slides forward along the first guide shaft 124, and the first shift gear 125 slidable with the first shifting fork 121 slides forward along the support shaft 126. The first shift gear 125 meshes with a forward drive high speed gear (not shown) disposed in a forward position. This produces a third forward speed state of the gear type speed change device 105.

On the other hand, when the shift control shaft 116 is slid rightward which is the biasing direction of the push spring 123, the control shaft 120 engages the engaging recess 122A of the second shifting fork 122.

When the shift control shaft 116 is rotated forward about the axis X2 in this state of engagement, the control shaft 120 swings rearward, the second shifting fork 122 slides rearward along a second guide shaft 127 extending fore and aft, and a second shift gear 128 slidable with the second shifting fork 122 slides rearward along the support shaft 126. The second shift gear 125 meshes with a forward drive intermediate speed gear (not shown) disposed in a rearward position. This produces a second forward speed state of the gear type speed change device 105.

Conversely, when the shift control shaft 116 is rotated rearward about the axis X2 in the above state of engagement, the control shaft 120 swings forward, the second shifting fork 122 slides forward along the second guide shaft 127, and the second shift gear 128 slides forward along the support shaft 126. The second shift gear 128 meshes with a reverse gear (not shown) disposed in a forward position. This produces a reverse drive state of the gear type speed change device 105.

As shown in FIGS. 13-20 and 22, the shift lever 115 has, rigidly attached to a proximal end thereof, front and rear link members 129 and 130 formed of strip steel plate, and a guided rod 131 formed of a round steel material and extending through the guide groove 119A of the guide plate 119. The shift lever 115 is rockable along the guide groove 119A, with the guided rod 131 guided by the guide plate 119.

The guide plate 119 is welded to an upper bracket 133 bolted to a lower left portion of a support frame 132 supporting the steering wheel 111. The upper bracket 133 has a supporting boss 134 welded thereto.

A lower bracket 136 is connected to a position of the vehicle body frame 103 opposed to the upper bracket 133. The lower bracket 136 has a supporting boss 135 welded thereto and projecting from the boarding step 110 toward the boss 134 of the upper bracket 133.

The upper and lower bosses 134 and 135 support a linking shaft 137 extending vertically therebetween to be rotatable about an axis Z2.

The linking shaft 137 is a tubular shaft formed of a round pipe material, with a bracket 138 welded to an upper end thereof and extending in an upper right direction, and a first pivot arm 139 welded to a lower end and extending rightward.

The first rocking arm 139 has a first push-pull rod 140 connected thereto and extending rearward from its free end along an upper surface of the boarding step 110. The rear end of the first push-pull rod 140 is connected to a second pivot arm 142 pivotable fore and aft about a transverse support shaft 141 provided at the left-hand side of the vehicle body frame 103.

The second pivot arm 142 is pivotable with a third pivot arm 143 extending rearward. The third pivot arm 143 has a second push-pull rod 144 connected thereto and extending rearward and upward from its free end. The rear end of the second push-pull rod 144 is connected to a fourth pivot arm 145 rigidly attached to a left end of the shift control shaft 116.

On the other hand, the bracket 138 is bifurcated to have front and rear linking portions 138A and 138B in upper parts thereof The rear link member 130 of the shift lever 115 is connected by a joint bolt 146 or the like to the rear linking portion 138B. With this connection, the shift lever 115 is rockable vertically about the axis Y2 of the joint bolt 146 and fore and aft about the axis Z2 of the linking shaft 137. The linking shaft 137 is rotatable about the axis Z2 with a fore and aft rocking operation of the shift lever 115.

That is, the tubular linking shaft 137, bracket 138, first pivot arm 139, first push-pull rod 140, support shaft 141, second pivot arm 142, third pivot arm 143, second push-pull rod 144 and fourth pivot arm 145 constitute the second link mechanism 118 which, in response to a fore and aft rocking operation of the shift lever 115, rotates the shift control shaft 116 about its axis X2 in a direction corresponding to the rocking direction of the shift lever 115.

The tubular linking shaft 137 has, mounted therein, a linking shaft 147 which shares the axis Z2, to be vertically slidable relative to the linking shaft 137 and to allow rotation of the linking shaft 137 relative to the linking shaft 147. The linking shaft 147 has an annular linkage groove 147A formed in upper end region thereof for receiving a linking pin 148 fixed to each of the linking members 129 and 30 of the shift lever 115.

The linking shaft 147 has a first push-pull rod 149 connected thereto and extending rearward and downward from a lower end thereof. The rear end part of the first push-pull rod 149 is connected to a first pivot arm 151 pivotable up and down about a transverse support shaft 150 provided at the left-hand side of the lower bracket 136.

The first rocking arm 151 is pivotable with a second pivot arm 152 extending upward. The second pivot arm 152 has a second push-pull rod 153 connected thereto and extending rearward from a free end thereof. The rear end of the second push-pull rod 153 is connected to a third pivot arm 155 pivotable fore and aft about a vertical rotating shaft 154 provided at the left-hand side of the vehicle body frame 103. The third pivot arm 155 is pivotable with a fourth pivot arm 156 extending forward from an upper part of the rotating shaft 154. A free end of the fourth pivot arm 156 is engaged with an annular linkage groove 116A formed in a left end portion of the shift control shaft 116.

That is, the linking shaft 147, first push-pull rod 149, pivot shaft 150, first pivot arm 151, second pivot arm 152, second push-pull rod 153, rotating shaft 154, third pivot arm 155 and fourth pivot arm 156 constitute the first link mechanism 117 which, in response to a vertical rocking operation of the shift lever 115, slides the shift control shaft 116 along its axis X2 in a direction corresponding to the rocking direction of the shift lever 115.

As described above, the linking shaft 147 of the first link mechanism 117 and the linking shaft 137 of second link mechanism 118 are combined in a double shaft structure to be slidable and rotatable relative to each other. This realizes a reduce space for their arrangement compared with the case of arranging the linking shafts 147 and 137 separately. In order to arrange the shift lever 115 close to the steering wheel 111 to facilitate changing of a grip therebetween, the first link mechanism 117 and second link mechanism 118 constituting the shifting control system may be passed along with the steering control system through a relatively narrow space defined by a front panel 157. Even in this case, a relatively large interval can be secured between the shifting control system and steering control system without providing such means as erecting the front panel 157 close to the driver's seat 112 or forming the front panel 157 to bulge by a large extent toward the driver's seat 112. As a result, the steering control system and shifting system may be assembled and maintained with ease while improving operability and securing comfort.

As shown in FIGS. 13-17 and 22, a push spring 158 is mounted between the shift lever 115 and upper bracket 133 for biasing the shift lever 115 upward. The shift lever 115 is biased upward by the biasing force of the push spring 158. That is, the shift lever 115 is biased in the selection channel 119a from the lower channel extending fore and aft between positions F1 and F3 toward the upper channel extending fore and aft between positions R and F2. By the biasing force of the push spring 158, the shift lever 115 may be retained in the neutral position N, first forward speed position F1, second forward speed position F2, third forward speed position F3 and reverse position R, with the guided rod 131 of shift lever 115 contacting the neutral position N, first forward speed position F1, second forward speed position F2, third forward speed position F3 or reverse position R of the guide groove 119A in the guide plate 119.

As shown in another embodiment, the guide plate 119 can be set to horizontal posture. In this case, the shift lever 115 is biased from an outward channel extending fore and aft toward an inward channel extending fore and aft.

As shown in FIGS. 14-17 and 22, the linking members 129 and 130 of the shift lever 115 have slots 129A and 130A extending longitudinally thereof and formed in positions between the linking pin 148 and joint bolt 146 fixed thereto. The slots 129A and 130A extending longitudinally are opposed to each other. A movable member 159 formed a round steel material extends through these slots 129A and 130A to be movable toward and away from the linking pins 148. A tension spring 160 extends between an outer end of each linking pin 148 and an end of the movable member 159.

On the other hand, each of the linking portions 138A and 138B of the bracket 138 to which the shift lever 115 is connected has a guide bore 138C formed therein as a guide device for guiding the movable member 159 toward and away from the linking pin 148 in response to a vertical rocking operation of the shift lever 115 along the selection channel 119a.

That is, the slots 129A and 130A formed in the respective linking members 129 and 130, the pair of guide bores 138C formed in the bracket 138, the pair of linking pins 148, movable member 159 and the pair of tension springs 160 constitute operation resistance applying means 161 for applying operation resistance when the shift lever 115 is rocked vertically along the selection channel 119a. Each linking pin 148 serves also as a spring stop for holding one end of the corresponding tension spring 160.

Each guide bore 138C is formed to have an approximately S-shape curved guide portion 138a for changing a guide component of directions toward and away from each linking pin 148 acting on the movable member 159. Specifically, it is formed to guide the movable member 159 farther away from each linking pin 148 as the shift lever 115 is operated from the upper end to the lower end of the selection channel 119a. The guide component of directions toward and away from each linking pin 148 acting on the movable member 159 is reduced while the shift lever 115 is operated adjacent the upper end or lower end of the selection channel 119. The guide component of directions toward and away from each linking pin 148 acting on the movable member 159 is increased when the shift lever 115 reaches the predetermined intermediate part of the selection channel 119a.

With this construction, the operation resistance applying means 161 applies a substantially fixed small operation resistance, regardless of operation of the shift lever 115, while the shift lever 115 is rocked vertically between the neutral position N located at the upper end of the selection channel 119a, and a part located in the predetermined intermediate part of the selection channel 119a and communicating with the second forward speed position F2 and reverse position R.

The operation resistance applying means 161 applies a substantially fixed large operation resistance, regardless of operation of the shift lever 115, while the shift lever 115 is rocked vertically between a part located at the lower end of the selection channel 119a and communicating with the first forward speed position F1 and third forward speed position F3, and the part communicating with the second forward speed position F2 and reverse position R.

When the shift lever 115 is rocked downward from the neutral position N and reaches the part located in the predetermined intermediate part of the selection channel 119a and communicating with the second forward speed position F2 and reverse position R, the operation resistance by the action of the operation resistance applying means 161 changes rapidly from the small state to the large state in response to the operation of the shift lever 115. Conversely, when the shift lever 115 is rocked upward from the part communicating with the first forward speed position F1 and third forward speed position F3 and reaches the part in the predetermined intermediate part of the selection channel 119a and communicating with the second forward speed position F2 and reverse position R, the operation resistance by the action of the operation resistance applying means 161 changes rapidly from the large state to the small state in response to the operation of the shift lever 115.

That is, when the shift lever 115 is operated from the neutral position (upper end) of the selection channel 119a and reaches the part (predetermined intermediate part) communicating with the second forward speed position F2 and reverse position R, the operating load on the shift lever 115 suddenly becomes heavy due to the action of the operation resistance applying means 161. Conversely, when the shift lever 115 is operated from the part (lower end) communicating with the first forward speed position F1 and third forward speed position F3 and reaches the part (predetermined intermediate part) communicating with the second forward speed position F2 and reverse position R, the operating load on the shift lever 115 suddenly becomes light. Thus, the driver, without taking the trouble of visually checking a control position of the shift lever 115, can recognize easily that the shift lever 115 has reached the part (predetermined intermediate part) communicating with the second forward speed position F2 and reverse position R. The shift lever 115 can be operated from the communicating part to the second forward speed position F2 or reverse position R smoothly and efficiently.

Figure 13:
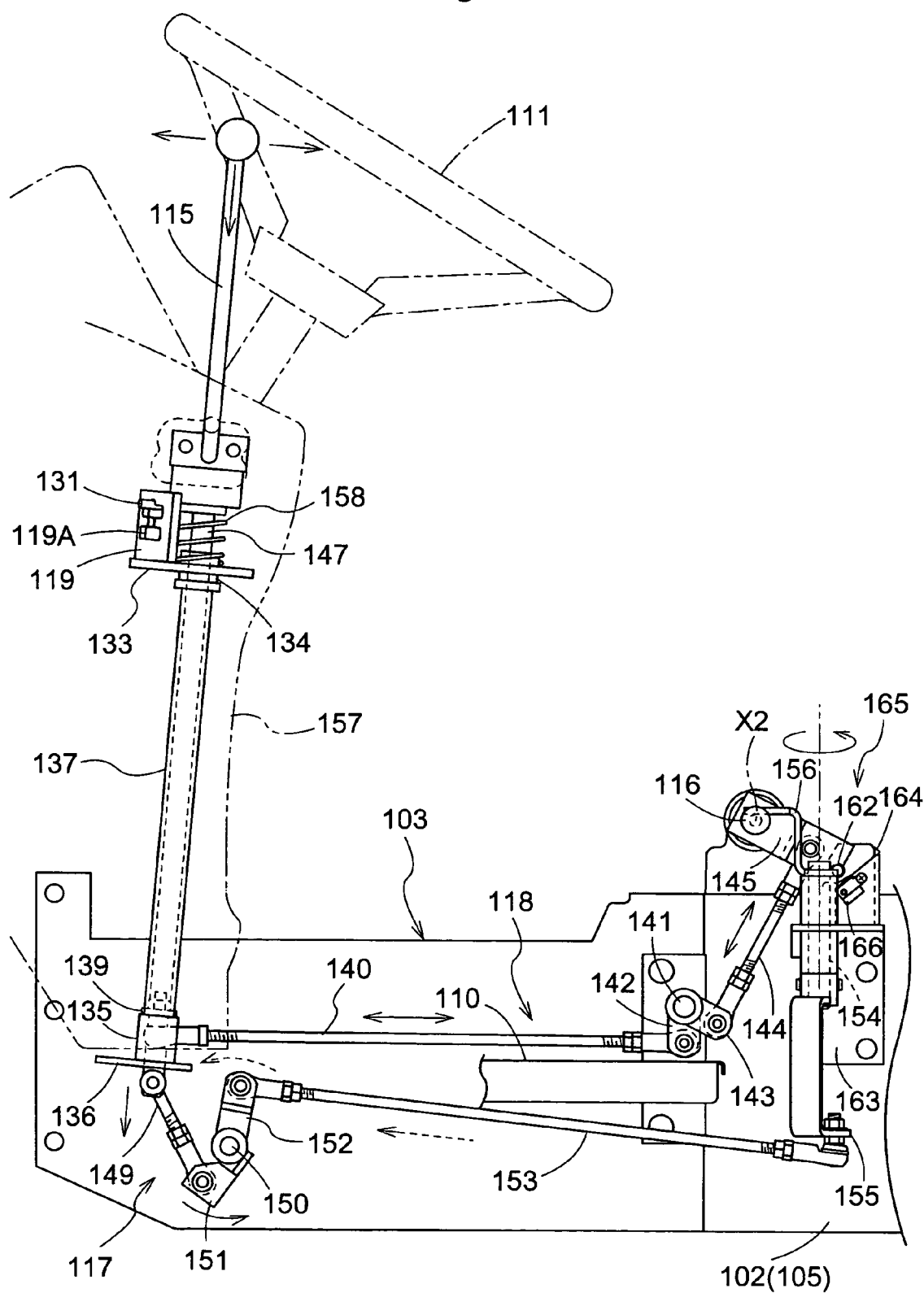
FIG. 13 is a side view of a shifting operation structure.
Figure 14:
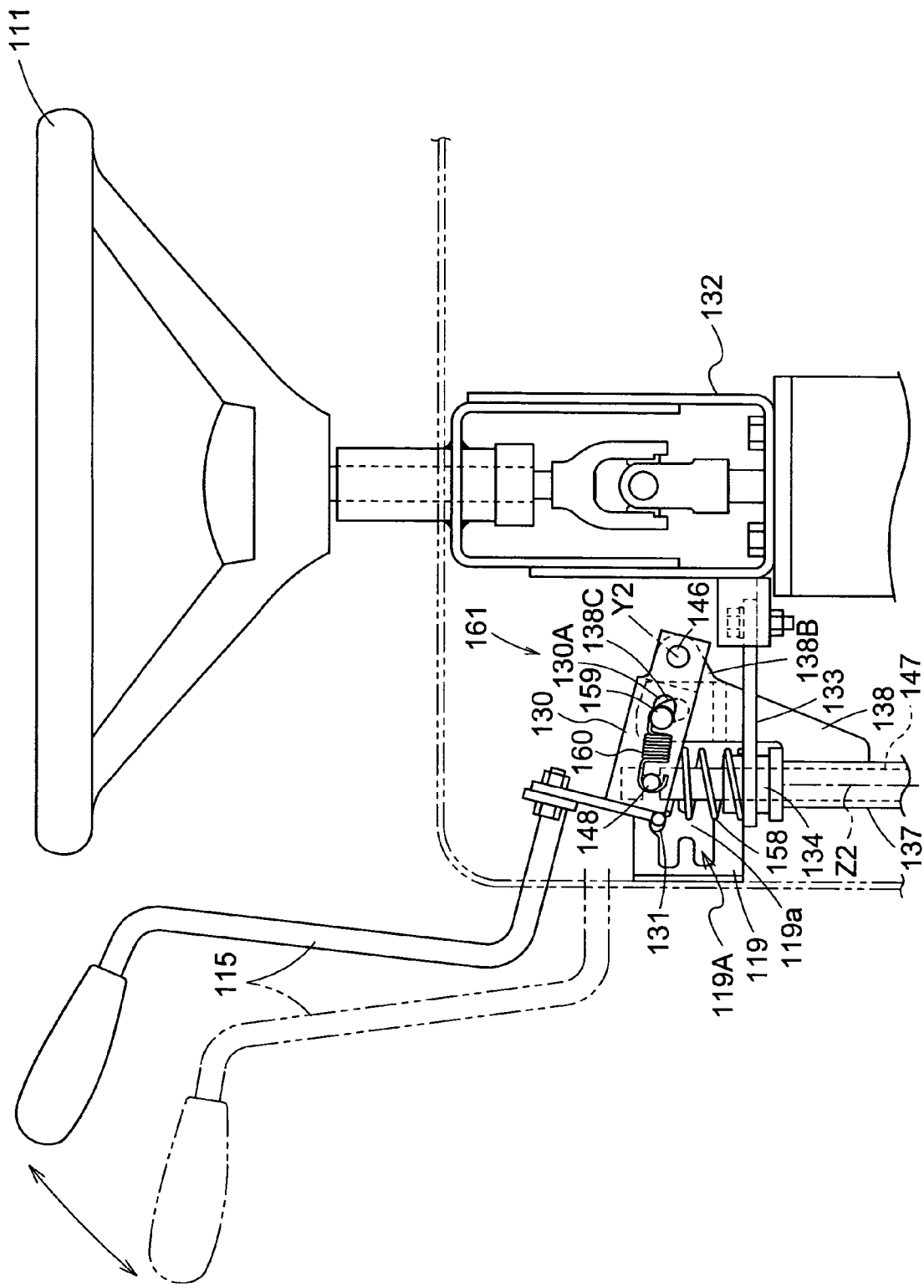
FIG. 14 is a rear view of a shift lever and adjacent components of the shift operation structure.
Figure 15:
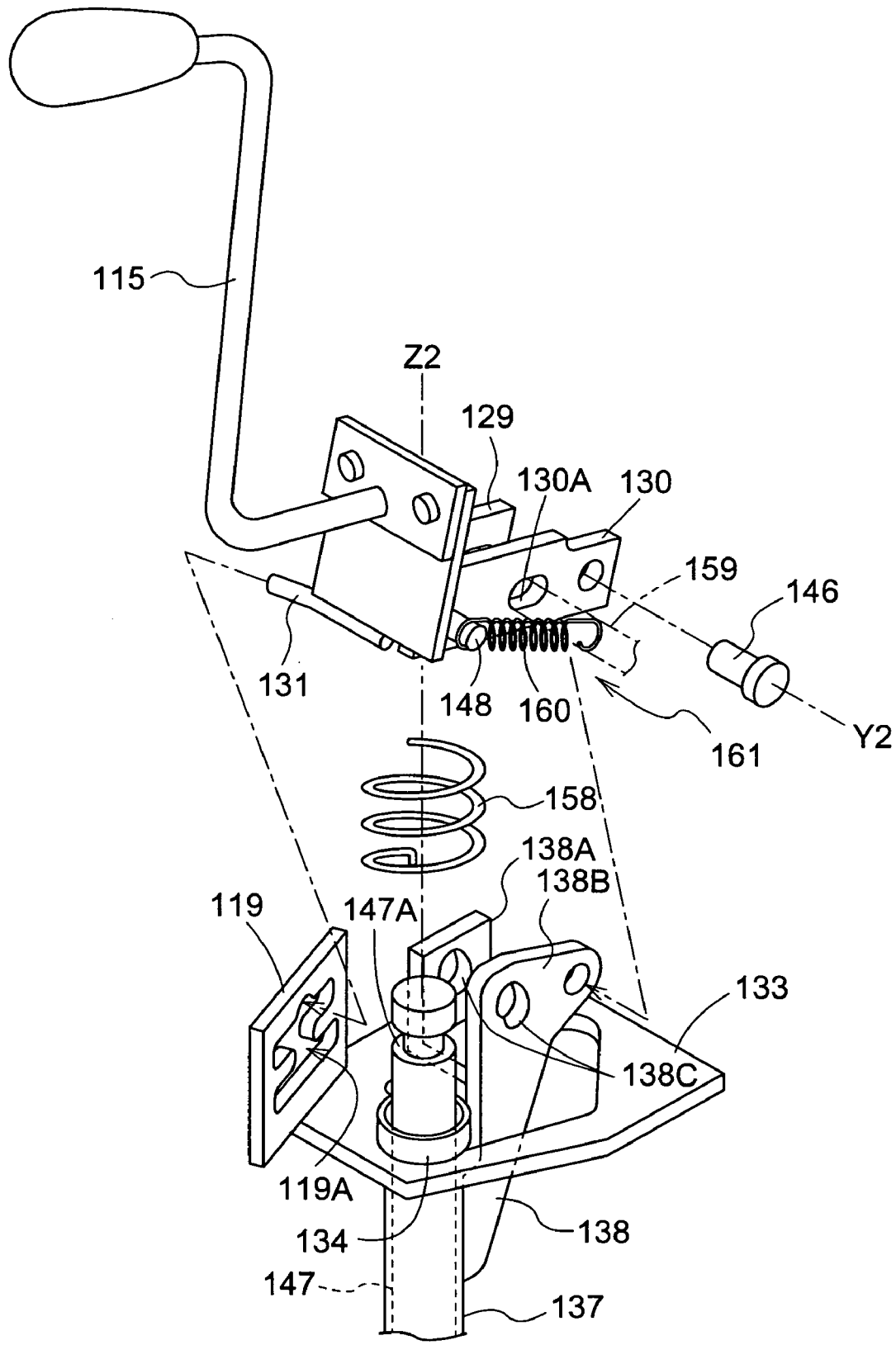
FIG. 15 is an exploded perspective view of the shift lever and adjacent components of the shift operation structure.
Figure 16:
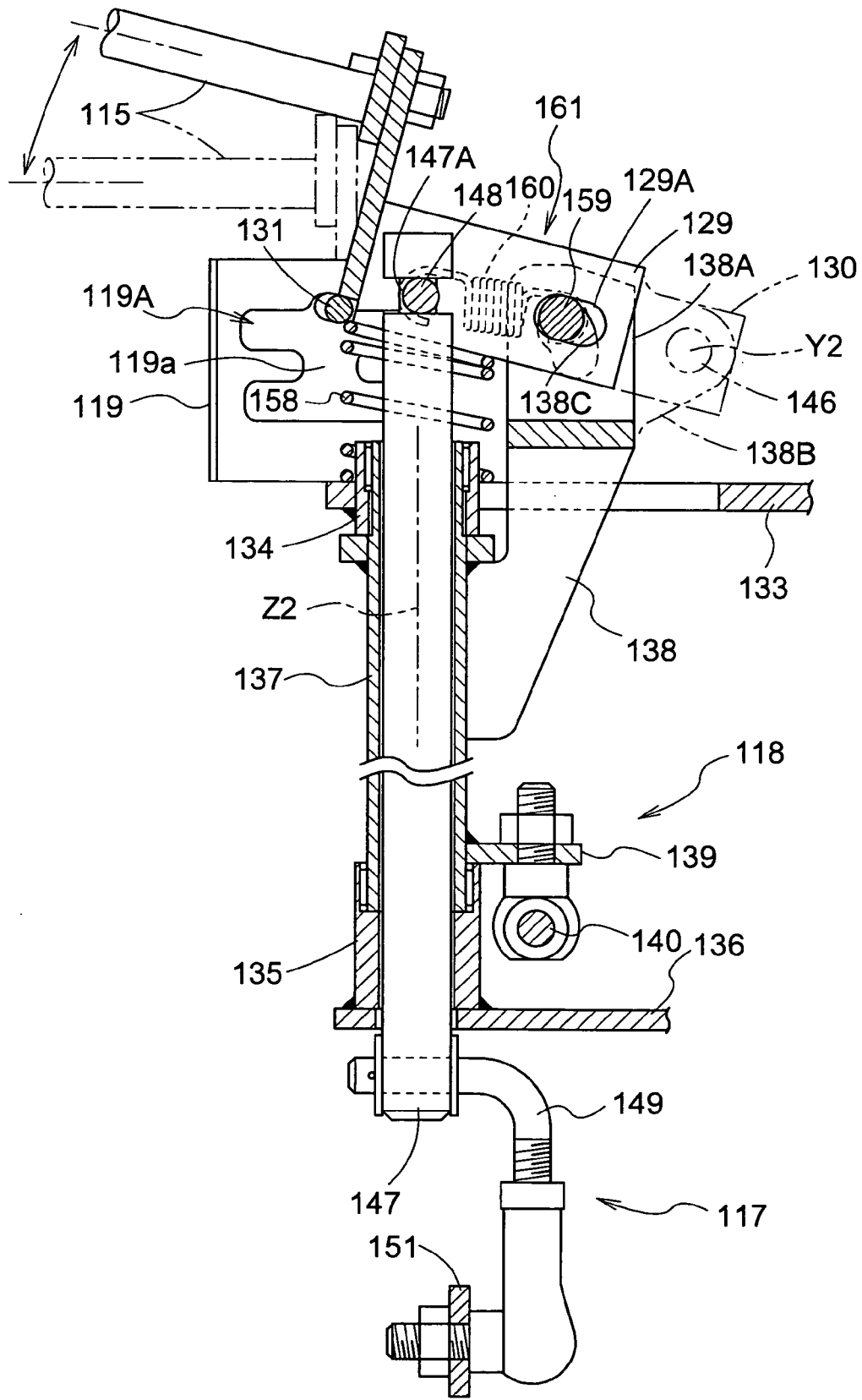
FIG. 16 is a rear view in vertical section of the shift lever and adjacent components of the shift operation structure.
Figure 17:
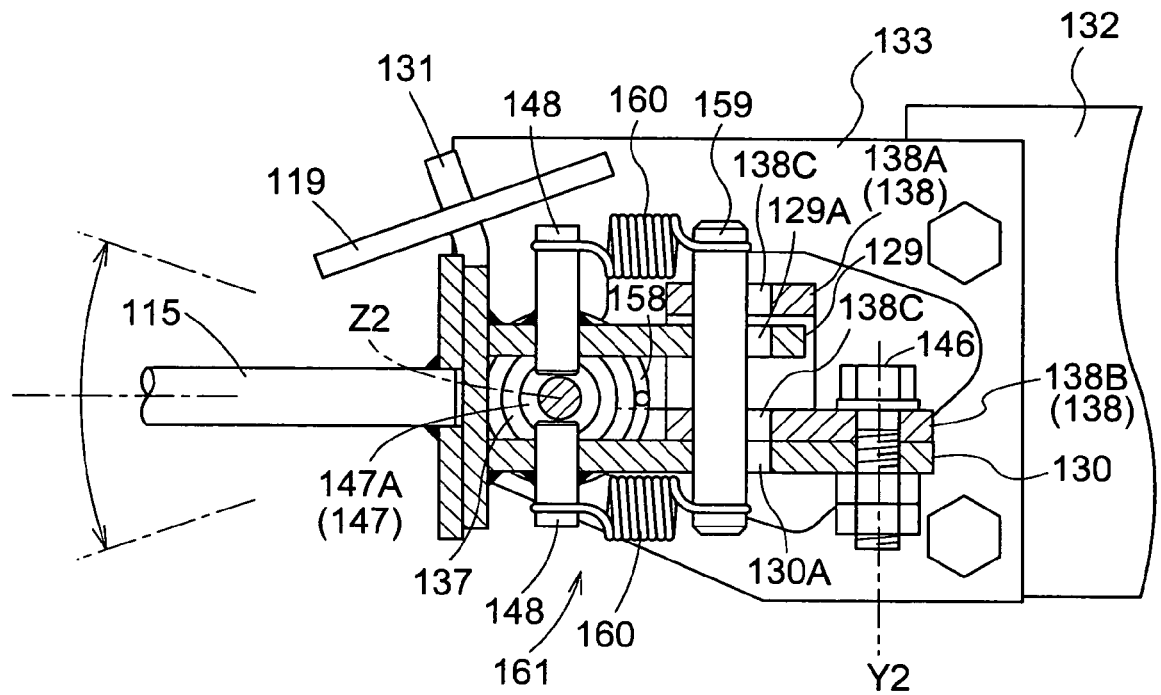
FIG. 17 is a plan view in cross section of the shift lever and adjacent components of the shift operation structure.
Figure 20:
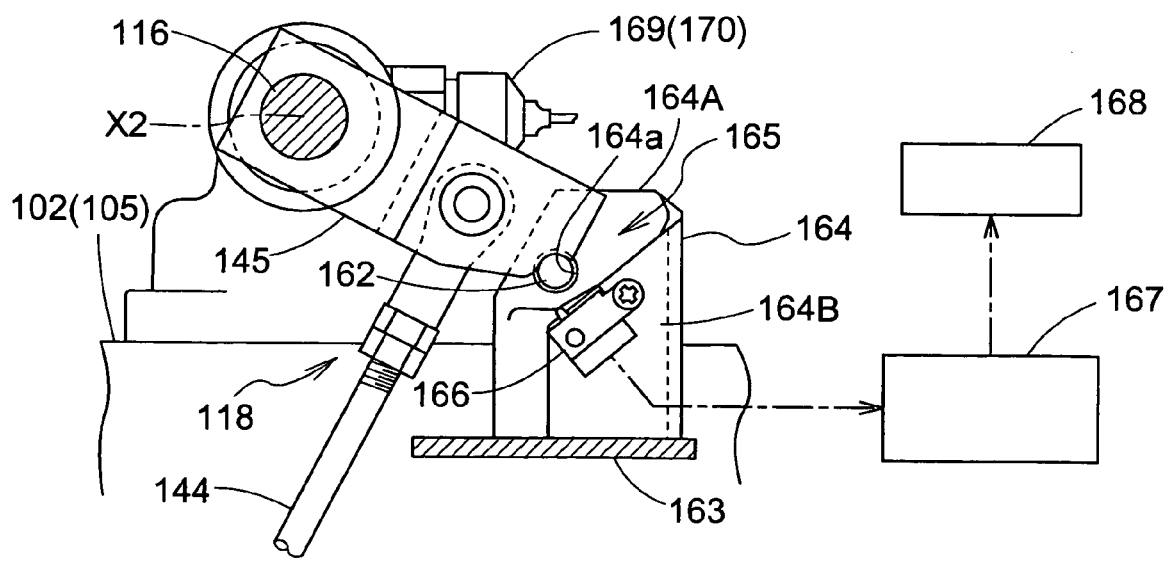
FIG. 20 is a side view in vertical section of the speed control shaft and adjacent components of the shift operation structure.

As shown in FIGS. 13, 19 and 20, the fourth pivot arm 145 rigidly attached to the shift control shaft 116 has a restrictor pin 162 welded to a free end thereof. The restrictor pin 162 is parallel to the shift control shaft 116 to be slidable right and left therewith, and pivotable with the fourth pivot arm 145 about the shift control shaft 116.

On the other hand, the vehicle body frame 103 has a bracket 163 for supporting the rotating shaft 154 of the first link mechanism 117. The bracket 163 has a restrictor plate 164 erected thereon and U-shaped in plan view, with a right-hand wall 164A defining a bore 164a for receiving the restrictor pin 162.

The restrictor pin 162 is inserted into the bore 164a of the restrictor plate 164 as the shift lever 115 is rocked vertically to move the guided rod 131 of shift lever 115 off toward the neutral position N from the part of selection channel 119a communicating with the second forward speed position F2 and reverse position R. The restrictor pin 162 is separated from the bore 164a of the restrictor plate 164 when the guided rod 131 of shift lever 115 is moved from the neutral position N and reaches the part communicating with the second forward speed position F2 and reverse position R.

Thus is, the restrictor pin 162 and restrictor plate 164 constitute a restricting mechanism 165 for reliably restricting rotation of the shift control shaft 116 about the axis X2 while the guided rod 131 of the shift lever 115 moves from the neutral position N of the selection channel 119a to the part communicating with the second forward speed position and reverse position R. This reliably prevent the possibility of the gear type speed change device 105 being shifted from the neutral state to the second forward speed state or reverse drive state by rotation of the shift control shaft 116 about the axis X2 due to fore and aft play or the like of the guided rod 131 in the selection channel 119a.

The left wall 164B of the restrictor plate 164 is shaped to avoid contact with the restrictor pin 162 when the restriction by the restricting mechanism 165 is canceled. The left wall 164B has a backup switch 166 attached to an outer surface thereof. The backup switch 166 is turned on by the restrictor pin 162 only when the shift control shaft 116 rotates backward about the axis X2 in response to a rocking operation to the reverse position of the shift lever 115.

The backup switch 166, when turned on, outputs an ON signal to a control device 167 in the form of a microcomputer mounted in the vehicle body. Based on the ON signal from the backup switch 166, the control device 167 controls operation of a control valve 168 for controlling a flow of hydraulic fluid to the lift cylinder, thereby automatically raising the right and left lift arms 108 to a predetermined upper limit position.

With the construction for operating the backup switch 166 with the restrictor pin 162 rigidly attached to the shift control shaft 116, when the reverse drive state of the gear type speed change device 105 is produced by operation of the shift control shaft 116, the backup switch 166 will be turned on by the restrictor pin 162 reliably without requiring a positional adjustment of the backup switch 166. The right and left lift arms 108 are thereby reliably and automatically raised to the predetermined upper limit position. As a result, an improvement in assembly is made for realizing this automatic backup function.

Although not shown, the right and left lift arms 108 are raised and lowered by the control device 167 controlling operation of the control valve 168 based on operation of a raising and lowering control instrument provided for the driving platform 113.

As shown in FIGS. 19 through 21, the shift control shaft 116 has a single recess 116B of conical shape formed in a peripheral surface thereof. The transmission case 102 has a neutral detection switch 169 with a detecting element 169A. The detecting element 169A enters the recess 116B of the shift control shaft 116 only when the shift control shaft 116 is in a rotating position for producing the neutral state of the gear type speed change device 105, and in a predetermined right end position, thereby to turn on the neutral detection switch 169. The neutral detection switch 169 is turned off when the detecting element 169A disengages from the recess 116B and contacts the peripheral surface of the shift control shaft 116.

Although not shown, the neutral detection switch 169, when turned on, permits electrification of an engine start circuit, and when turned off, inhibits electrification of the engine start circuit.

That is, the recess 116B of the shift control shaft 116 and the neutral detection switch 169 constitute a starting check mechanism 170 for permitting the engine 104 to start only when the shift control shaft 116 has rotated to a predetermined position to produce the neutral state of the gear type speed change device 105, and reached the predetermined right end position. This avoids the possibility of the vehicle body inadvertently starting moving with starting of the engine 104.

The shift control shaft 116 having reached the predetermined right end position is retained in the predetermined rotating position for producing the neutral state of the gear type speed change device 105, by the action of the restricting mechanism 165 described above. This can prevent with increased reliability the possibility that the vehicle body starts moving with starting of the engine 104. Further, in the neutral state where the shift control shaft 116 has reached the predetermined right end position, the detecting element 169A of the neutral detection switch 169 engages the recess 116B of the shift control shaft 116 without fail, whereby the neutral detection switch 169 switches to ON state. Consequently, the engine 104 can be started reliably.

The shift lever 115 and shift control shaft 116 are operatively connected such that the neutral position N of the shift lever 115 corresponds to the predetermined right end position of the shift control shaft 116.

Other Embodiments

[1] The working vehicle may be an agricultural working vehicle such as a combine or rice planting machine, a construction working vehicle such as a backhoe or wheel loader, or a grass mower.

[2] The control lever 115 may be a shift lever for shifting a hydrostatic stepless transmission, a shift lever for changing drive speed of a working implement, or a lift lever for raising and lowering a working implement.

[3] The control lever 115 may be one disposed laterally of the driver's seat 112.

[4] Various changes may be made to the predetermined control positions arranged at the opposite ends and the predetermined intermediate part of the selection channel 119a. For example, the neutral position N may be set to one end of the selection channel 119a, the reverse position R to the rear side at the other end of the selection channel 119a, the first forward speed position F1 to the front side of the predetermined intermediate part of the selection channel 119a, and the second forward speed position F2 to the rear side of the predetermined intermediate part. The first forward speed position F1 may be set to the front side at one end of the selection channel 119a, the second forward speed position F2 to the rear side at the one end, the reverse position R to the front side of the predetermined intermediate part, and a fourth forward speed position F4 to the rear side of the predetermined intermediate part.

[5] The selection channel 119a may have the neutral position N at one end thereof, a high-speed forward speed region at the front side of the other end, a low-speed forward speed region at the front side of the predetermined intermediate part of selection channel 119a, and a reverse drive region at the rear side of the predetermined intermediate part.

[6] A detent mechanism or the like may be employed as the operation resistance applying means 161.

[7] A push spring or helical spring may be employed as the spring 160 extending between each spring stop 148 and movable member 159.

[8] Each guide 138C for guiding the movable member 159 may be formed by a groove, cutout or special member.

[9] Each guide bore 138C may be formed to increase the guide component of directions toward and away from each linking pin 148 acting on the movable member 159 while the shift lever 115 is operated adjacent the upper end or lower end of the selection channel 119a, and reduce the guide component of directions toward and away from each linking pin 148 acting on the movable member 159 when the shift lever 115 reaches the predetermined intermediate part of the selection channel 119a.

What is claimed is:

1. A speed shift device for operating a propelling speed change device for a work vehicle, the speed shift device comprising:
    a single speed change lever located in a position laterally of a steering wheel support shaft to be rockable in a fore and aft direction and a vertical direction of the work vehicle, the steering wheel support shaft extending through a front panel of the work vehicle, a steering wheel being provided at one end of the steering wheel support shaft; and
    a lever guide for allowing movement of the speed change lever within operating paths extending on a laterally oriented side, the laterally oriented side being outwardly spaced apart from the steering wheel support shaft in a transverse direction of the work vehicle, as seen in a direction of an axis of the steering wheel support shaft;
    wherein the operating paths include a plurality of fore and aft channels extending substantially in a fore and aft direction and a straight communication channel connecting the fore and aft channels, the fore and aft channels extending at different levels with respect to the vertical direction, the fore and aft channels including a top fore and aft channel extending at a highest location with respect to the vertical direction at a closest location to the steering wheel, and at least one other fore and aft channel extending at a lower location than the top fore and aft channel;
    wherein, when the speed change lever is rocked in the fore and aft direction along the top fore and aft channel, the propelling speed change device is switched over only to a rearward traveling state and a forward traveling state having substantially a same speed reduction ratio as the rearward traveling state; and
    wherein, when the speed change lever is rocked from the other fore and aft channel to the top fore and aft channel along the communication channel, a handgrip of the speed change lever approaches the steering wheel below the steering wheel, whereby the speed change lever is operable fore and aft along the top fore and aft channel with an operator's hand gripping the steering wheel.

2. A speed shift device according to claim 1, wherein the top fore and aft channel, the other fore and aft channel and the communicating channel, which constitute the operating paths, together define an H-shaped form.

3. A speed shift device according to claim 1, further comprising a spring urging the speed change lever within the communicating channel to move out of the other fore and aft channel toward the top fore and aft channel.

4. A speed shift device according to claim 1,
    wherein the top fore and aft channel includes a holding position for retaining the speed change lever in position between a position for switching over the propelling speed change device to the forward traveling state when the speed change lever is within the top fore and aft channel, and a further position for switching over this propelling speed change device to the rearward traveling state; and wherein the propelling speed change device is in a neutral state when the speed change lever is in the holding position.

5. A speed shift device according to claim 1, wherein the speed change lever within the communicating channel is urged to enter the top fore and aft channel.

6. A speed shift device according to claim 1, wherein the lever guide is formed integrally with a lateral side of the front panel.

7. A speed shift device according to claim 1, wherein the top fore and aft channel and the other fore and aft channel extend straight and parallel to each other.

8. A speed shift device for operating a propelling speed change device for a work vehicle, the speed shift device comprising:
- a single speed change lever located in a position laterally of a steering wheel support shaft to be rockable in a fore and aft direction and a vertical direction of the work vehicle, the steering wheel support shaft extending through a front panel of the work vehicle, a steering wheel being provided at one end of the steering wheel support shaft; and
- a lever guide for allowing movement of the speed change lever within operating paths extending on a laterally oriented side, the laterally oriented side being outwardly spaced apart from the steering wheel support shaft in a transverse direction of the work vehicle, as seen in a direction of an axis of the steering wheel support shaft;
- wherein the operating paths include a plurality of fore and aft channels extending substantially in a fore and aft direction and a straight communication channel connecting the fore and aft channels, the fore and aft channels extending at different levels with respect to the vertical direction, the fore and aft channels including a top fore and aft channel extending at a highest location with respect to the vertical direction at a closest location to the steering wheel, and at least one other fore and aft channel extending at a lower location than the top fore and aft channel;
- wherein the top fore and aft channel includes a holding position for retaining the speed change lever in position between a position for switching over the propelling speed change device to the forward traveling state when the speed change lever is within the top fore and aft channel, and a further position for switching over this propelling speed change device to the rearward traveling state;
- wherein the propelling speed change device is in a neutral state when the speed change lever is in the holding position;
- wherein a tension spring is connected between the speed change lever and a vertically extending bracket so as to bias the speed change lever in a direction parallel to the top fore and aft channel toward the holding position; and
- wherein a push spring is mounted between the speed change lever and a horizontally extending bracket so as to bias the speed change lever in a direction parallel to the communication channel toward the holding position.

9. A speed shift device according to claim 8, wherein the top fore and aft channel, the other fore and aft channel and the communicating channel, which constitute the operating paths, together define an H-shaped form.

10. A speed shift device according to claim 8, wherein the top fore and aft channel and the other fore and aft channel extend straight and parallel to each other.

11. A speed shift device according to claim 8, wherein, when the speed change lever is rocked in the fore and aft direction along the top fore and aft channel, the propelling speed change device is switched over only to a rearward traveling state and a forward traveling state having substantially a same speed reduction ratio as the rearward traveling state.

12. A speed shift device according to claim 8, wherein, when the speed change lever is rocked from the other fore and aft channel to the top fore and aft channel along the communication channel, a handgrip of the speed change lever approaches the steering wheel below the steering wheel, whereby the speed change lever is operable fore and aft along the top fore and aft channel with an operator's hand gripping the steering wheel.

* * * * *

UNITED STATES PATENT AND TRADEMARK OFFICE
CERTIFICATE OF CORRECTION

PATENT NO. : 7,648,001 B2
APPLICATION NO. : 11/509306
DATED : January 19, 2010
INVENTOR(S) : Yanagihara et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 471 days.

Signed and Sealed this

Sixteenth Day of November, 2010

David J. Kappos
*Director of the United States Patent and Trademark Office*